US012580145B2

(12) United States Patent
Zhang et al.

(10) Patent No.: US 12,580,145 B2
(45) Date of Patent: Mar. 17, 2026

(54) CIRCUIT BREAKER

(71) Applicants: Shanghai Electrical Apparatus Research Institute (Group) Co., Ltd, Shanghai (CN); Shanghai Electrical Apparatus Research Institute, Shanghai (CN)

(72) Inventors: Senlin Zhang, Shanghai (CN); Bingqing Wang, Shanghai (CN); Rongwei Zhou, Shanghai (CN); Jisheng Sun, Shanghai (CN)

(73) Assignees: Shanghai Electrical Apparatus Research Institute (Group) Co., Ltd, Shanghai (CN); Shanghai Electrical Apparatus Research Institute, Shanghai (CN)

( * ) Notice: Subject to any disclaimer, the term of this patent is extended or adjusted under 35 U.S.C. 154(b) by 252 days.

(21) Appl. No.: 18/280,449

(22) PCT Filed: Feb. 16, 2022

(86) PCT No.: PCT/CN2022/076513
§ 371 (c)(1),
(2) Date: Sep. 5, 2023

(87) PCT Pub. No.: WO2022/183911
PCT Pub. Date: Sep. 9, 2022

(65) Prior Publication Data

US 2024/0145199 A1 May 2, 2024

(30) Foreign Application Priority Data

Mar. 5, 2021 (CN) ......................... 202110246058.4

(51) Int. Cl.
*H01H 71/02* (2006.01)
*H01H 71/10* (2006.01)
(Continued)

(52) U.S. Cl.
CPC ............ *H01H 71/10* (2013.01); *H01H 71/02* (2013.01); *H01H 73/06* (2013.01); *H01H 73/18* (2013.01)

(58) Field of Classification Search
CPC ...... H01H 71/10; H01H 71/02; H01H 71/521; H01H 71/528; H01H 73/06; H01H 73/18
(Continued)

(56) References Cited

U.S. PATENT DOCUMENTS 5,296,664 A * 3/1994 Crookston ........... H01H 71/501 200/DIG. 42
5,793,270 A * 8/1998 Beck .................... H01H 77/104 335/46
(Continued)

FOREIGN PATENT DOCUMENTS

CN 101038833 A 9/2007
CN 108695124 A 10/2018
(Continued)

OTHER PUBLICATIONS

Translation of CN212625414 (original document published Feb. 26, 2021) (Year: 2021).*
(Continued)

*Primary Examiner* — William A Bolton
(74) *Attorney, Agent, or Firm* — East IP P.C.

(57) ABSTRACT

A circuit breaker, comprising a housing, an operation assembly, an arc extinguishing device, and a transmission mechanism. The housing has, in a first direction, a bottom and a top opposite to each other, an accommodation portion recessed from the top to the bottom, and an accommodation cavity semi-surrounding the accommodation portion; a rotating wheel and a movable contact connected to the rotating wheel are provided in the accommodation cavity close to the top and adjacent to the accommodation portion in a second
(Continued)

direction, wherein the first direction intersects the second direction; the operation assembly is rotatably and detachably connected to the top of the housing; the arc extinguishing device comprises an arc extinguishing chamber located in the accommodation cavity and close to the bottom of the housing. The circuit breaker can avoid interference between the transmission mechanism and other components while increasing the size of the arc extinguishing chamber.

11 Claims, 17 Drawing Sheets

(51) Int. Cl.
*H01H 73/06* (2006.01)
*H01H 73/18* (2006.01)

(58) Field of Classification Search
USPC ...... 218/1, 12, 14, 20, 32, 78; 200/401, 410, 200/244, 243, 250, 255, 335
See application file for complete search history.

(56) References Cited

U.S. PATENT DOCUMENTS

| | | | | |
|---|---|---|---|---|
| 8,420,968 | B2 * | 4/2013 | Park | H01H 71/501 335/171 |
| 8,975,990 | B2 * | 3/2015 | Godesa | H01H 71/525 335/171 |
| 10,217,591 | B1 * | 2/2019 | Blankemeyer | H01H 71/12 |
| 10,256,066 | B2 * | 4/2019 | Sun | H01H 71/10 |
| 10,381,180 | B1 | 8/2019 | Ferree | |
| 10,395,864 | B2 * | 8/2019 | Court | H01H 71/52 |
| 10,643,801 | B2 * | 5/2020 | Pan | H01H 3/30 |
| 2018/0122611 | A1 * | 5/2018 | Lee | H01H 73/18 |

FOREIGN PATENT DOCUMENTS

| | | | |
|---|---|---|---|
| CN | 212625414 | U | 2/2021 |
| CN | 113593977 | A | 11/2021 |

OTHER PUBLICATIONS

The International search report for PCT Application No. PCT/CN2022/076513, dated May 20, 2022, 8 pages.

* cited by examiner

CIRCUIT BREAKER

CROSS REFERENCE TO RELATED APPLICATIONS

This application is a National Stage of International Application No. PCT/CN2022/076513, filed on Feb. 16, 2022, which claims priority to Chinese Patent Application No. 202110246058.4, entitled "CIRCUIT BREAKER", filed on Mar. 5, 2021, both of which are hereby incorporated by reference in their entireties.

TECHNICAL FIELD

This application relates to the technical field of electrical equipment, and in particular to a circuit breaker.

BACKGROUND

A circuit breaker refers to a switching device that can open, close, carry, and break current under normal circuit conditions and can open, close, carry, and break current under abnormal circuit conditions within a specified time.

The circuit breaker includes a transmission mechanism, an arc extinguishing mechanism, an operation assembly, and the like. The transmission mechanism is configured for transmitting signals to control proximity or separation of a movable contact and a fixed contact. In conventional design, an arc extinguishing chamber is usually placed vertically, that is, the size of the arc extinguishing chamber depends on the height or thickness of a housing of the circuit breaker. If the capacity of the arc extinguishing chamber is to be increased, the overall height or thickness of the circuit breaker is required to be increased, which is not conducive to cost control. In addition, during opening and closing operations of the circuit breaker, the transmission direction of the existing transmission mechanism is a vertical direction, and the transmission mechanism is prone to interference with other components, so the overall circuit breaker is prone to malfunction and damage.

SUMMARY

Embodiments of this application provide a circuit breaker, which can solve problems in the prior art that the structural design is not compact, the volume of an arc extinguishing chamber is small, and a transmission mechanism is susceptible to interference.

An embodiment of this application provides a circuit breaker, including a housing, an operation assembly, an arc extinguishing device, and a transmission mechanism, where the housing has, in a first direction, a bottom and a top opposite to each other, an accommodation portion recessed from the top to the bottom, and an accommodation cavity semi-surrounding the accommodation portion; a rotating wheel and a movable contact connected to the rotating wheel are provided in the accommodation cavity close to the top and adjacent to the accommodation portion in a second direction, where the first direction intersects the second direction; the operation assembly is rotatably and detachably connected to the top of the housing, and can be rotated to be accommodated in the accommodation portion or rotated to exit from the accommodation portion; the arc extinguishing device includes an arc extinguishing chamber located in the accommodation cavity and close to the bottom of the housing; and the transmission mechanism is configured for transmitting, to the rotating wheel, a first signal sent by the operation assembly in the second direction, so as to drive the movable contact to move.

In some embodiments, the transmission mechanism includes a first connecting rod, a second connecting rod, and a main elastic member; and the first connecting rod and the second connecting rod are rotatably connected through a rotating shaft, the first signal is transmitted to the rotating wheel via the first connecting rod and the second connecting rod, one end of the main elastic member is connected to the rotating shaft, and force applied to the rotating shaft by the main elastic member enables the rotating shaft to move in the first direction.

In some embodiments, the rotating wheel includes a first rotating portion and a peripheral portion surrounding the first rotating portion, and the first rotating portion is rotatably arranged on the housing; the first connecting rod has a first connecting point and a second connecting point in its length direction, and the first connecting point is configured for rotating around a first specific point; and the second connecting rod has a third connecting point and a fourth connecting point in its length direction, the second connecting point is rotatably connected to the third connecting point through the rotating shaft, the second connecting rod is connected to the peripheral portion through the fourth connecting point, and the second specific point coincides with the first rotating portion.

In some embodiments, the operation assembly is rotatably connected to the housing, and one end of the main elastic member is connected to the operation assembly and moves synchronously with the operation assembly.

In some embodiments, the circuit breaker further includes a connecting rod limit shaft for increasing a movement rate of the first connecting rod.

In some embodiments, the circuit breaker further includes a locking mechanism, the locking mechanism and the operation assembly are synchronously stored in the accommodation portion, the locking mechanism sends a second signal which is transmitted by the transmission mechanism to the rotating wheel in the second direction, so as to drive the movable contact to move.

In some embodiments, a fixed contact is provided in the accommodation cavity, the fixed contact is located on one side of the movable contact, and the rotating wheel is configured for driving the movable contact to move, so that the movable contact gets close to or away from the fixed contact.

In some embodiments, the arc extinguishing device includes a fixed contact arc guide member and a movable contact arc guide member; the fixed contact arc guide member is located on a side, away from the movable contact, of the fixed contact; the movable contact arc guide member is arranged on a side, away from the fixed contact arc guide member, of the movable contact; and the movable contact arc guide member, the fixed contact arc guide member, and the bottom of the housing surround the arc extinguishing chamber.

In some embodiments, the locking mechanism includes a first locking member and a second locking member capable of locking each other, the second signal is transmitted to the transmission mechanism via the first locking member and the second locking member, and an abutting point between the first locking member and the second locking member is located between the arc extinguishing chamber and the transmission mechanism.

In some embodiments, the locking mechanism surrounds a concave space, and the operation assembly slides inside a recessed portion of the concave space and sends the first signal to the transmission mechanism.

In some embodiments, an end, away from the rotating shaft, of the main elastic member is connected to the operation assembly.

In some embodiments, the locking mechanism includes a third locking member and a fourth locking member, the second locking member and the third locking member are capable of locking each other, the third locking member and the fourth locking member are capable of locking each other, a release is provided in the accommodation cavity on a side, away from the rotating wheel, of the accommodation portion, the release sends the second signal to the fourth locking member, and an abutting point between the second locking member and the third locking member is located between the arc extinguishing chamber and the transmission mechanism.

In some embodiments, the operation assembly sends a third signal to drive the first locking member and the second locking member to lock.

A circuit breaker in the embodiments of this application includes an operation assembly, an arc extinguishing device, a transmission mechanism, a locking mechanism, and the like, where the transmission mechanism is configured for transmitting power to the rotating wheel to drive the movable contact to move, and the operation assembly sends a first signal to the transmission mechanism to achieve manual control on opening and closing. During closing, the locking mechanism remains in a locked state to ensure the stability of the internal structure of the circuit breaker. When the circuit malfunctions, the locking mechanism is unlocked and sends a second signal to the transmission mechanism to separate the movable and fixed contacts. The transmission mechanism in this application is in lateral transmission and the transmission direction is parallel to the length direction of the arc extinguishing chamber. Therefore, under the premise of a definite volume of the entire circuit breaker, the size of the arc extinguishing chamber is larger, and interference between the transmission mechanism and other components can be avoided to improve overall reliability.

DESCRIPTION OF THE DRAWINGS

The features, advantages, and technical effects of the exemplary embodiments of this application will be described below with reference to the accompanying drawings.

In order to explain the technical solutions of the embodiments of this application more clearly, the accompanying drawings required in the embodiments of this application will be briefly introduced below. A person of ordinary skill in the art can obtain other drawings based on these drawings without creative work.

REFERENCE NUMERALS

Figure 1:
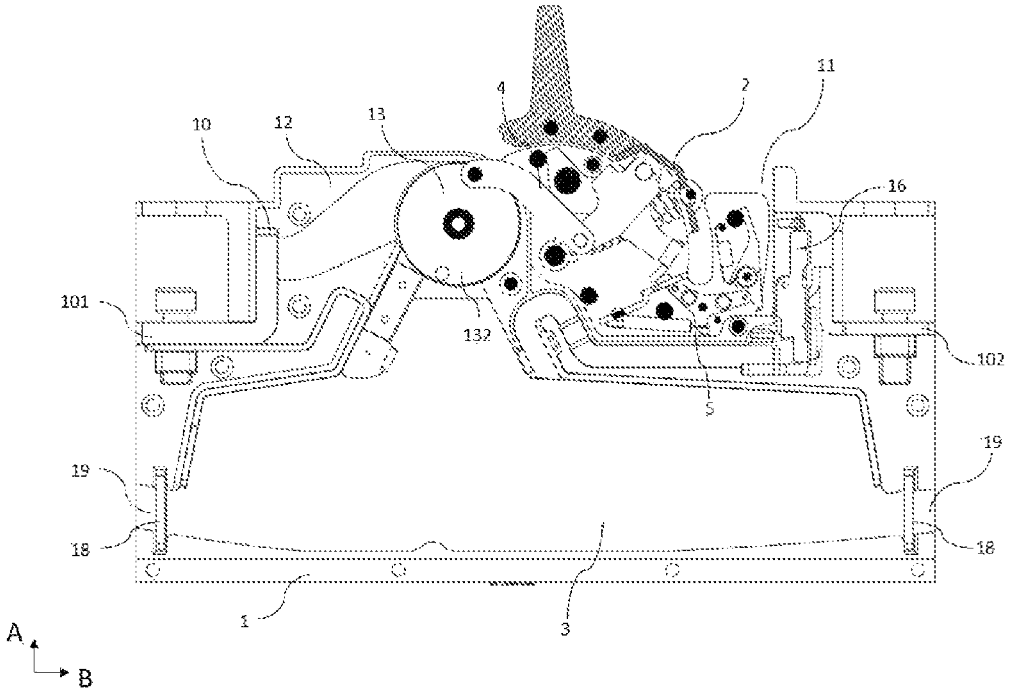
FIG. 1 is a schematic structural diagram of a circuit breaker in a tripped state according to an embodiment of this application.

1. housing; 11. accommodation portion; 12. accommodation cavity; 13. rotating wheel; 131. first rotating portion; 132. peripheral portion; 14. movable contact; 141. movable contact arc guide member; 15. fixed contact; 151. fixed contact arc guide member; 16. release; 161. overcurrent release; 162. release actuator; 17. limit shaft; 18. deionization device; 19. exhaust hole; 10. wiring board; 101. first wiring board; 102. second wiring board;

2. operation assembly; 21. support member; 211. sub side plate; 212. third avoidance hole; 213. side wall; 214. fixed pin; 215. rolling wheel; 22. rotating member; 221. rotating plate; 2211. rotating shaft connecting end; 2212. arc-shaped clamping surface; 2213. rotating end; 222. hanging portion; 2221. body; 2222. shaft pin placement groove; 2223. through hole; 2224. first end; 2225. second end; 2226. third surface; 2231. avoidance surface; 2232. second clamping surface; 2233. limit surface; 23. handle;

3. arc extinguishing device; 31. arc extinguishing chamber;

4. transmission mechanism; 41. first connecting rod; 411. first connecting point; 412. second connecting point; 413. first specific point; 42. second connecting rod; 421. third connecting point;

422. fourth connecting point; 423. second specific point; 43. main elastic member; 431. third specific point; 44. rotating shaft;

5. locking mechanism; 51. first locking member; 511. first side plate; 512. connecting plate; 513. second surface; 514. clamping surface; 515. mounting lug; 5151. second rotating portion; 516. transmission arm; 5161. first abutting surface; 5162. second abutting surface; 5163. second mounting hole; 517. guide plate; 518. arc-shaped guide surface;

52. second locking member; 521. clamping fit portion; 522. transition connection portion; 523. first transmission portion; 524. first side surface; 525. clamping fit surface; 526. first avoidance hole; 527. second avoidance hole; 528. first through hole; 529. clamping groove; 520. protrusion;

53. fourth locking member; 531. substrate; 532. second transmission portion; 533. step structure; 534. rotating shaft; 535. first transition surface; 536. second transition member; 537. arc-shaped transition surface;

54. linkage assembly; 541. first retractable member; 542. second retractable member; 543. third locking member; 544. y-shaped clamping plate; 5441. first clamping end; 5442. second clamping end; 5443. connecting end; 545. first shaft rod; 546. second shaft rod; 547. roller; 548. mounting groove; 549. third shaft rod; A. first direction; B. second direction; C. third direction; D. fourth direction; E. fifth direction.

DETAILED DESCRIPTION

Features and exemplary embodiments of various aspects of this application will be described in detail below. In order to make the objectives, technical solutions, and advantages of this application clearer, this application will be further described in detail below with reference to the accompanying drawings and specific embodiments. It should be understood that the specific embodiments described here are only intended to explain this application, but not to limit this application. For those skilled in the art, this application can be implemented without some of these specific details. The following description of the embodiments is merely to provide a better understanding of the present application by showing examples of the present application.

It should be noted that the relational terms herein, such as first and second, are only used for distinguishing one entity or operation from another, and do not necessarily require or imply that any actual relationship or sequence exists between these entities or operations. Moreover, the terms "include", "comprise", and any variants thereof are intended to cover a non-exclusive inclusion, so that a process, method, article, or device including a series of elements not only includes those elements, but also includes other elements not listed explicitly, or includes inherent elements of the process, method, article, or device. In the absence of more limitations, an element defined by "include a . . . " does not exclude other same elements existing in the process, method, article, or device including the element.

Figure 2:
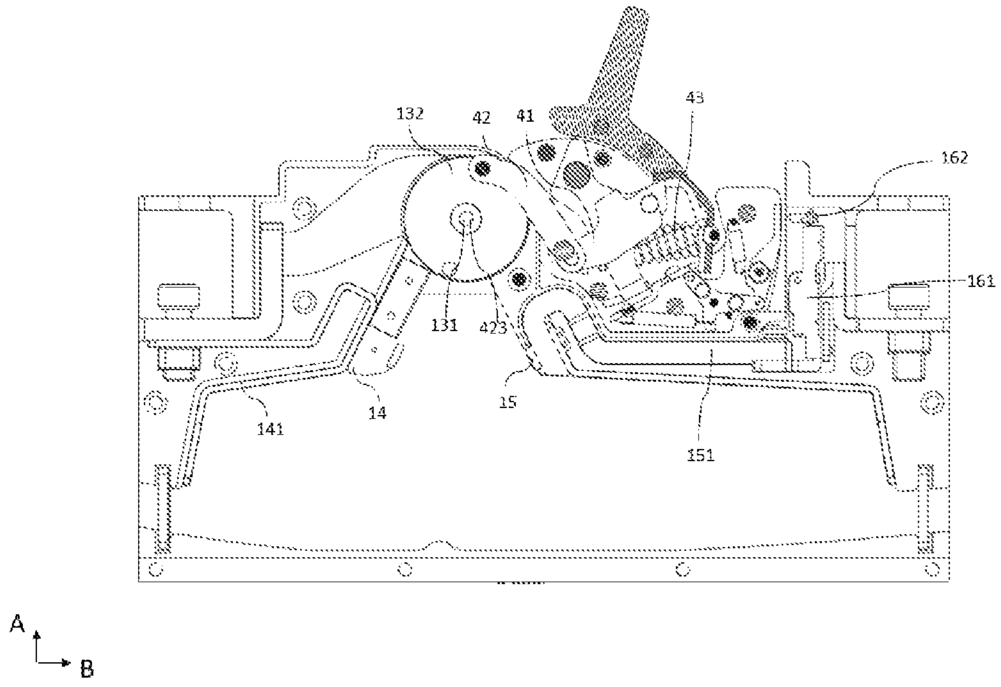
FIG. 2 is a schematic structural diagram of a circuit breaker in a locked state according to an embodiment of this application.

With reference to FIG. 1 and FIG. 2, a circuit breaker provided in an embodiment of this application includes a housing 1, an operation assembly 2, an arc extinguishing device 3, and a transmission mechanism 4, where the housing 1 has, in a first direction A, a bottom and a top opposite to each other, an accommodation portion 11 recessed from the top to the bottom, and an accommodation cavity 12 semi-surrounding the accommodation portion 11; a rotating wheel 13 and a movable contact 14 connected to the rotating wheel 13 are provided in the accommodation cavity 12 close to the top and adjacent to the accommodation portion 11 in a second direction B; the operation assembly 2 is rotatably and detachably connected to the top of the housing 1 and can be rotated to be accommodated in or to exit from the accommodation portion 11; the arc extinguishing device 3 includes an arc extinguishing chamber 31 located in the accommodation cavity 12 and close to the bottom; and the transmission mechanism 4 is configured for transmitting, to the rotating wheel 13, a first signal sent by the operation assembly 2 in the second direction B, so as to drive the movable contact 14 to move.

In the embodiments of this application, the transmission mechanism 4 is close to the top of the housing 1, the arc extinguishing device 3 is close to the bottom of the housing 1 and arranged laterally, and the two are laterally parallel and do not interfere with each other, so compared with conventional circuit breakers, the arc extinguishing chamber 31 of this application has a larger volume and can accommodate more grids to improve the reliability of breaking a movable contact and a fixed contact; and the transmission of the transmission mechanism 4 in the second direction B avoids interference with other components. In this embodiment, the transmission of the transmission mechanism 4 in the second direction B indicates that the overall transmission direction has corresponding sequential transmission signals in the second direction B, rather than limiting corresponding transmission signals, connecting points, and mounting points to a straight line.

The housing 1 has a recessed accommodation portion 11 and an accommodation cavity 12 surrounding the accommodation portion 11, where the accommodation cavity 12 may surround only two planes of the accommodation portion 11, or simultaneously surround three or more planes of the accommodation portion 11. In the embodiments of this application, the description is made by taking the case, in which the accommodation cavity 12 surrounds three planes of the accommodation portion 11, as an example. The accommodation cavity 12 presents a concave structure, the accommodation portion 11 is located in a recessed area of the concave structure and surrounded by the accommodation cavity 12, and the accommodation portion 11 is separated from the accommodation cavity 12 by the housing 1, that is, the housing 1 is in contact with the three planes of the accommodation portion 11 to form a semi-surrounding structure.

The rotating wheel 13, the movable contact 14, and the arc extinguishing device 3 are all located in the accommodation cavity 12. The rotating wheel 13 is located close to the top of the housing 1, and the movable contact 14 is located on the rotating wheel 13 away from the top of the housing 1. The rotating wheel 13 is rotatably connected to the housing 1 and moves synchronously with the movable contact 14. The movable contact 14 is used with a fixed contact 15. When the movable contact 14 engages with the fixed contact 15, the circuit breaker is in a connected state, that is, the circuit breaker is in a closed state. When the movable contact 14 disengages from the fixed contact 15, the circuit breaker is in a disconnected state, that is, the circuit breaker is in an open state.

The arc extinguishing chamber 31 in the arc extinguishing device 3 is located near the bottom of the housing 1, and the movable contact 14 is located between the rotating wheel 13 and the arc extinguishing chamber 31. At the moment of circuit breaker opening, due to the capacitance between the movable contact 14 and the fixed contact 15, the insulation between the contacts is broken and an arc is generated. The existence of the arc not only expands the overall fault degree of the circuit system, but also causes damage to the contacts themselves, Therefore, the circuit breaker needs to be equipped with an arc extinguishing device 3 to reduce the burning loss of the contact caused by the arc and limit the space for arc expansion. In this solution, a length direction of the arc extinguishing chamber 31 is approximately parallel to the second direction B, that is, the arc extinguishing chamber 31 extends in a long edge direction of the circuit breaker. In an ordinary circuit breaker, the arc extinguishing chamber 31 usually extends in a height direction of the circuit breaker. Therefore, compared with existing circuit breakers, under the premise of the same overall volume of the circuit breakers, the arc extinguishing chamber 31 in this application has a larger capacity and can be mounted with more grids, thereby improving the reliability of high-voltage breaking of the movable and fixed contacts.

In this embodiment, the operation assembly 2 is arranged in the accommodation portion 11 and detachably connected to the housing 1. The operation assembly 2 is configured for driving the rotating wheel 13 to rotate on the housing 1, and a portion of the transmission mechanism 4 is located in the accommodation portion 11 for transmission connection with the operation assembly 2 and the rotating wheel 13. The operation assembly 2 sends a first signal to the transmission mechanism 4, and the transmission mechanism 4 transmits the first signal to the rotating wheel 13 in the second direction B, so that the movable contact 14 gets close to or away from the fixed contact 15. The first direction A intersects the second direction B, and the angle between the two directions is not limited by this application, as long as the two directions do not overlap or parallel to each other. In some solutions, the first direction A and the second direction B are perpendicular to each other. In this case, the first direction A is parallel to an overall length direction of the circuit breaker, and the second direction B is parallel to a height direction of the circuit breaker, that is, the transmission direction of the transmission mechanism 4 is parallel to the length direction of the arc extinguishing chamber 31, the transmission mechanism 4 is close to the top of housing 1, the arc extinguishing chamber 31 is close to the bottom of housing 1, and the two are parallel and do not interfere with each other. In this embodiment, the transmission of the transmission mechanism 4 in the second direction B indicates that the overall transmission direction has corresponding sequential transmission signals in the second direction B, rather than limiting corresponding transmission signals, connecting points, and mounting points to a straight line.

In some other embodiments, the transmission mechanism 4 includes a first connecting rod 41, a second connecting rod 42, and a main elastic member 43, where the first connecting rod 41 and the second connecting rod 42 are rotatably connected through a rotating shaft 44, the first signal is transmitted to the rotating wheel 13 via the first connecting rod 41 and the second connecting rod 42, one end of the main elastic member 43 is connected to the rotating shaft 44 and the other end is connected to the operation assembly 2, and force applied to the rotating shaft 44 by the main elastic member 43 enables displacement of the rotating shaft 44 in the first direction A.

As shown in FIG. 2, one end of the first connecting rod 41 is relatively close to the operation assembly 2 and the other end is rotatably connected to the second connecting rod 42 through the rotating shaft 44, and an end, away from the first connecting rod 41, of the second connecting rod 42 is connected to the rotating wheel 13. In other embodiments, the operation assembly 2 and the rotating wheel 13 may alternatively be connected to other positions of the first connecting rod 41 and the second connecting rod 42, which is not limited by this application, as long as the transmission direction of the transmission mechanism 4 follows the second direction B. When the circuit breaker is opened or closed, the staff sends the first signal to the main elastic member 43 of the transmission mechanism 4 through the operation assembly 2, the first connecting rod 41 drives the second connecting rod 42 to move together, the rotating wheel 13 rotates, the movable contact 14 gets close to or away from the fixed contact 15, and the connection and disconnection of the overall circuit are achieved.

One end of the main elastic member 43 is connected to the rotating shaft 44 and the other end is connected to the operation assembly 2. The end, connected to the operation assembly 2, of the main elastic member 43 is configured for receiving external force, and the other end is configured for applying tensile force to the rotating shaft 44 and driving the rotating shaft 44 to move. The rotating shaft 44 may be fixedly connected to the first connecting rod 41 or the second connecting rod 42, or may be rotatably connected to both the first connecting rod 41 and the second connecting rod 42, which is not limited by this application. In the opening or closing process of the circuit breaker, the overall transmission direction of the first connecting rod 41 and the second connecting rod 42 follows the second direction B, while the movement direction of the rotating shaft 44 is the first direction A, that is, under the tensile force of the main elastic member 43, the movement direction of the connection between the first connecting rod 41 and the second connecting rod 42 intersects the overall transmission direction of the transmission mechanism 4. In some optional embodiments, the movement direction of the rotating shaft 44 is nearly perpendicular to the overall transmission direction of the transmission mechanism 4. Through such design, the overall length of the transmission mechanism 4 in the second direction B can be reduced, so that the circuit breaker has a more compact structure to save lateral space.

It may be understood that the transmission mechanism 4 includes a first connecting rod 41, a second connecting rod 42, and a main elastic member 43, where the first connecting rod 41 has a first connecting point 411 and a second connecting point 412 in its length direction, and the first connecting point 411 is configured for rotating around a first specific point 413; the second connecting rod 42 has a third connecting point 421 and a fourth connecting point 422 in its length direction, the second connecting point 412 is rotatably connected to the third connecting point 421 through the rotating shaft 44, and the fourth connecting point 422 is configured for rotating around a second specific point 423; and one end of the main elastic member 43 is connected to the rotating shaft 44, and the other end is configured for receiving external force, where the main elastic member 43 applies force to the rotating shaft 44 under an external force, so that the rotating shaft 44 moves towards a direction intersecting a line connecting the first connecting point 411 and the fourth connecting point 422.

Figure 4:
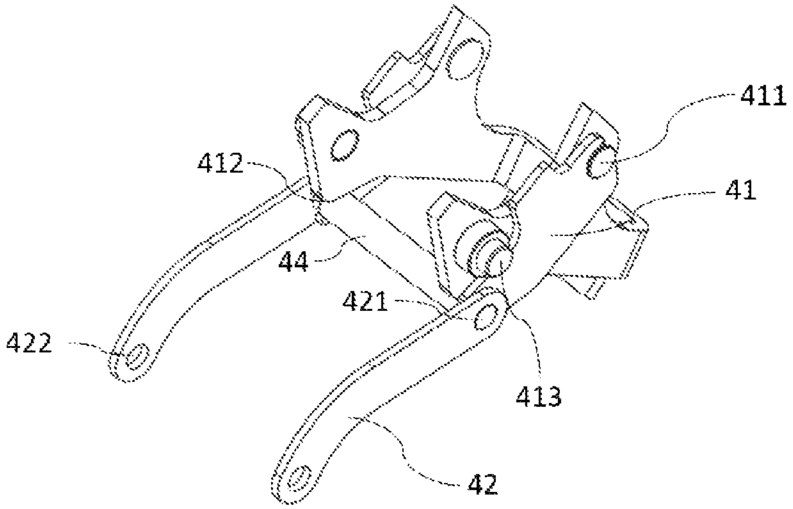
FIG. 4 is a schematic structural diagram of a transmission mechanism according to an embodiment of this application.
Figure 5:
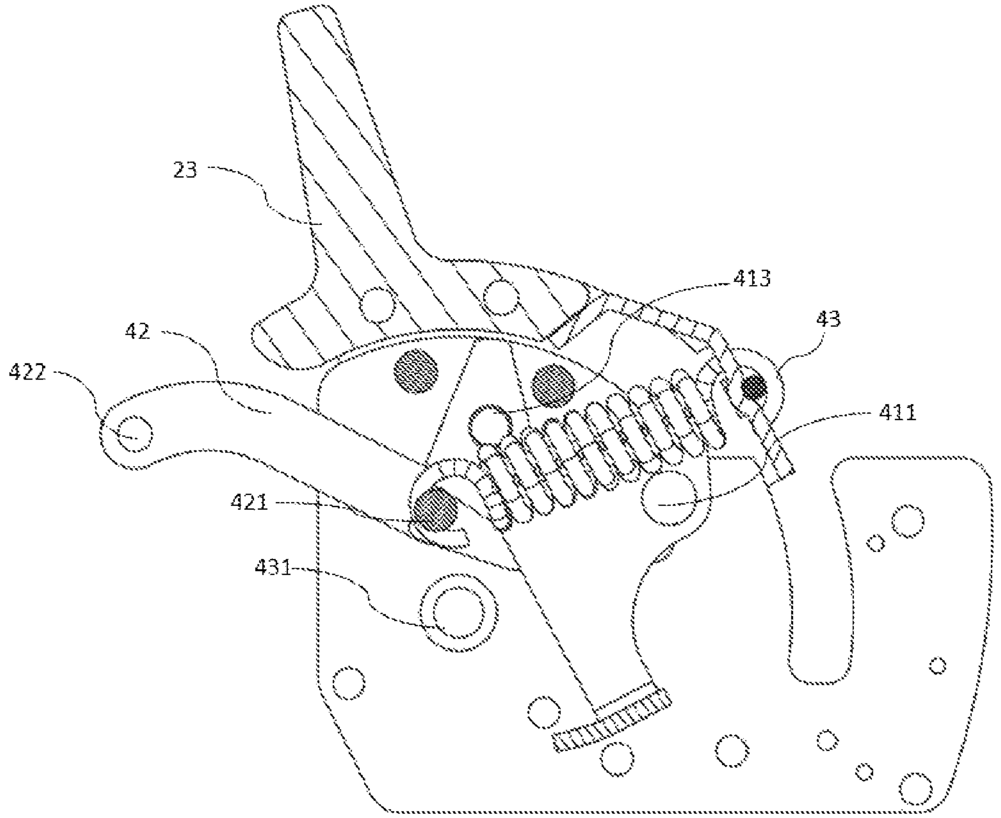
FIG. 5 is a partially enlarged view of an internal transmission mechanism of the circuit breaker according to an embodiment of this application.

The first connecting point 411, the second connecting point 412, the third connecting point 421, and the fourth connecting point 422 may be located at different positions of the first connecting rod 41 and the second connecting rod 42 respectively, which is not limited by this application. In some optional solutions, as shown in FIG. 4 and FIG. 5, the first connecting point 411 and the second connecting point 412 are located at two ends of the first connecting rod 41 separately, the third connecting point 421 and the fourth connecting point 422 are located at two ends of the second connecting rod 42 separately, and the second connecting point 412 and the third connecting point 421 are connected through the rotating shaft 44.

The motion of the transmission mechanism 4 in this application includes two cases. In the first case, the first connecting point 411 on the first connecting rod 41 remains fixed, the end, away from the second connecting rod 42, of the main elastic member 43 moves under an external force, and the position of the rotating shaft 44 does not change; when a specific moment arrives, the main elastic member 43 releases energy to the rotating shaft 44 and drives the rotating shaft 44 to move relatively; and then both the first connecting rod 41 and the second connecting rod 42 begin to rotate, the second connecting point 412 on the first connecting rod 41 rotates around the first connecting point 411, the third connecting point 421 on the second connecting rod 42 has a same motion track as the second connecting point 412, and the fourth connecting point 422 rotates around the second specific point 423. In this process, the rotating shaft 44 rotates around the first connecting point 411, and the movement direction of the rotating shaft 44 always intersects the line connecting the first connecting point 411 and the fourth connecting point 422, where the main elastic member 43 plays a role in transmitting the external force to drive the first connecting rod 41 and the second connecting rod 42 to move relatively.

In the second case, the first connecting point 411 on the first connecting rod 41 can rotate relatively around the first specific point 413; under the influence of other external force factors, the first connecting point 411 rotates around the first specific point 413, and the second connecting point 412 on the first connecting rod 41, namely, the position of the rotating shaft 44 deviates with the movement of the first connecting point 411; and the force applied to the rotating shaft 44 by the main elastic member 43 enables the rotating shaft 44 to get relatively close to the first connecting point 411 in the second direction B, the third connecting point 421 on the second connecting rod 42 has the same motion track as the second connecting point 412, and the fourth connecting point 422 rotates around the second specific point 423. Like the first case, the movement direction of the rotating shaft 44 always intersects the line connecting the first connecting point 411 and the fourth connecting point 422.

In the foregoing two cases, the movement direction of the rotating shaft 44 always intersects the line connecting the first connecting point 411 and the fourth connecting point 422, that is, the movement direction of the rotating shaft 44 intersects the transmission direction of the entire transmission mechanism 4. In the circuit breaker of this application, the overall transmission direction of the transmission mechanism 4 is nearly parallel to the second direction B, and the movement direction of the rotating shaft 44 intersects or even may be perpendicular to the transmission direction, that is, the movement direction of the connecting points of the two connecting rods is nearly parallel to the first direction A. Compared with conventional circuit breakers, this design can make reasonable use of the internal spatial structure of the circuit breaker, thereby reducing the lateral space occupied by the entire transmission mechanism 4 in the circuit breaker. In this embodiment, the transmission mechanism 4 implements transmission in the second direction B, indicating that the overall transmission direction has corresponding sequential transmission signals in the second direction B, rather than limiting corresponding transmission signals, connection points, and mounting points to a straight line.

In the transmission mechanism provided in the embodiments of this application, as shown in FIG. 5, the end, away from the rotating shaft 44, of the main elastic member 43 is configured for rotating around the third specific point 431, where the third specific point 431, the second connecting point 412, and the first connecting point 411 are coplanar and non-collinear. The end, away from the rotating shaft 44, of the main elastic member 43 slides relatively along a specific track. The deflection angle of the main elastic member 43 relative to the third specific point 431 is determined according to the actual size inside the circuit breaker, and is not limited by this application.

In the transmission mechanism provided in the embodiments of this application, the main elastic member 43 has a tensile state and a reset state, and the length of the main elastic member 43 in the reset state is greater than that of the first connecting rod. The main elastic member 43 in this application may be a spring, an elastic rope, or the like. The reset state indicates that the main elastic member 43 is not subjected to any external force in its length direction, while the tensile state indicates that the main elastic member elongates under an external force in its length direction, and the elongation is less than its maximum elastic deformation variable. Therefore, the length of the main elastic member 43 in the tensile state is greater than that in the reset state, In this application, the main elastic member 43 is always in the tensile state, so during the movement of the transmission mechanism 4, the length of the main elastic member 43 is always greater than that of the first connecting rod 41. Because one end of the main elastic member 43 coincides with the second connecting point 412 on the first connecting rod 41, the end, away from the second connecting rod 42, of the main elastic member 43 is always separated from the first connecting point 411 on the first connecting rod 41, that is, the main elastic member 43 will not interfere with the first connecting rod 41, thereby improving the overall reliability of the transmission mechanism 4.

The end, away from the second connecting rod 42, of the main elastic member 43 is configured for receiving external force. Under an external force, the main elastic member 43 is gradually elongated, and its elastic force gradually increases. When the main elastic member 43 elongates to a specific length, the main elastic member 43 releases energy to the rotating shaft 44 and drives the rotating shaft 44 to move. The main elastic member 43, the rotating shaft 44, and the operation assembly 2 may be mounted in various ways. In some solutions, hooks are provided at two ends of the main elastic member 43, which is hooked to the rotating shaft 44 and the operation assembly 2 through the hooks. In other solutions, their connections may alternatively be implemented by bonding or welding.

In the transmission mechanism 4 provided in the embodiments of this application, as shown in FIG. 2 and FIG. 4, the first specific point 413 and the second specific point 423 are separately located on two sides of a line connecting the fourth connecting point 422 and the rotating shaft 44. The first specific point 413 is a rotational center of the first connecting point 411, and the second specific point 423 is a rotational center of the fourth connecting point 422. A line connecting the first specific point 413 and the second specific point 423 intersects the second connecting rod 42. The specific positions of the first specific point 413 and the second specific point 423 are determined according to the volume of the circuit breaker and the lengths of the first and second connecting rods, which is limited by this application.

In the transmission mechanism 4 provided in the embodiments of this application, the distance between the second specific point 423 and the rotating shaft 44 is always greater than that between the second specific point 423 and the fourth connecting point 422. Because the rotating shaft 44 is mounted on the third connecting point 421 of the second connecting rod 42, the distance between the second specific point 423 and the rotating shaft 44 is the same as that between the second specific point 423 and the third connecting point 421, that is, the distance between the second specific point 423 and the third connecting point 421 is greater than that between the second specific point 423 and the fourth connecting point 422. In this solution, a circle is made with the second specific point 423 as a center and the distance between the second specific point 423 and the fourth connecting point 422 as a radius. The rotating shaft 44 is always outside the circle, which is equivalent to that the second connecting point 412 is always outside the circumference, that is, the first connecting rod 41 will never interfere with the above circumference.

In the circuit breaker provided in the embodiments of this application, the rotating wheel 13 and the movable contact 14 connected to the rotating wheel 13 are provided in the housing 1, where the rotating wheel 13 includes a first rotating portion 131 and a peripheral portion 132 surrounding the first rotating portion 131, the first rotating portion 131 is rotatably arranged on the housing 1, the second connecting rod 42 is connected to the peripheral portion 132 through the fourth connecting point 422, and the second specific point 423 coincides with the first rotating portion 131. As shown in FIG. 2, the second connecting rod 42 is configured for directly driving the rotating wheel 13 to rotate around the first rotating portion 131, and the first rotating portion 131 may be located in the center of the rotating wheel 13 or may be arranged eccentrically. The distance between the second specific point 423 and the rotating shaft 44 is always greater than that between the second specific point 423 and the fourth connecting point 422, and the fourth connecting point 422 is located on the peripheral portion of the rotating wheel 13, so the first connecting rod 41 will not interfere with the rotating wheel 13.

In the circuit breaker provided in the embodiments of this application, the operation assembly 2 sends the first signal, and the transmission mechanism 4 transmits the first signal to the rotating wheel 13, so as to drive the movable contact 14 to move. The staff operates the operation assembly 2 to implement opening or closing operations, and instructions are transmitted between the operation assembly 2 and the rotating wheel 13 through the transmission mechanism 4. In some optional embodiments, a support member 21 of the operation assembly 2 is fixed on the housing 1, a rotating member 22 is rotatably mounted on the support member 21, and the end, away from the rotating shaft 44, of the main elastic member 43 is connected to the rotating member 22 through a hanging portion 222 and moves synchronously with the rotating member 22. During the movement of the rotating member 22, the main elastic member 43 begins to rotate and gradually elongates under the drive of the rotating member 22, and its elastic force gradually increases. When the main elastic member 43 crosses the first connecting point 411, the direction of tensile force of the main elastic member 43 on the rotating shaft 44 changes in the first direction A, and the main elastic member 43 releases energy to the rotating shaft 44 and drives the rotating shaft 44 to move.

Figure 3:
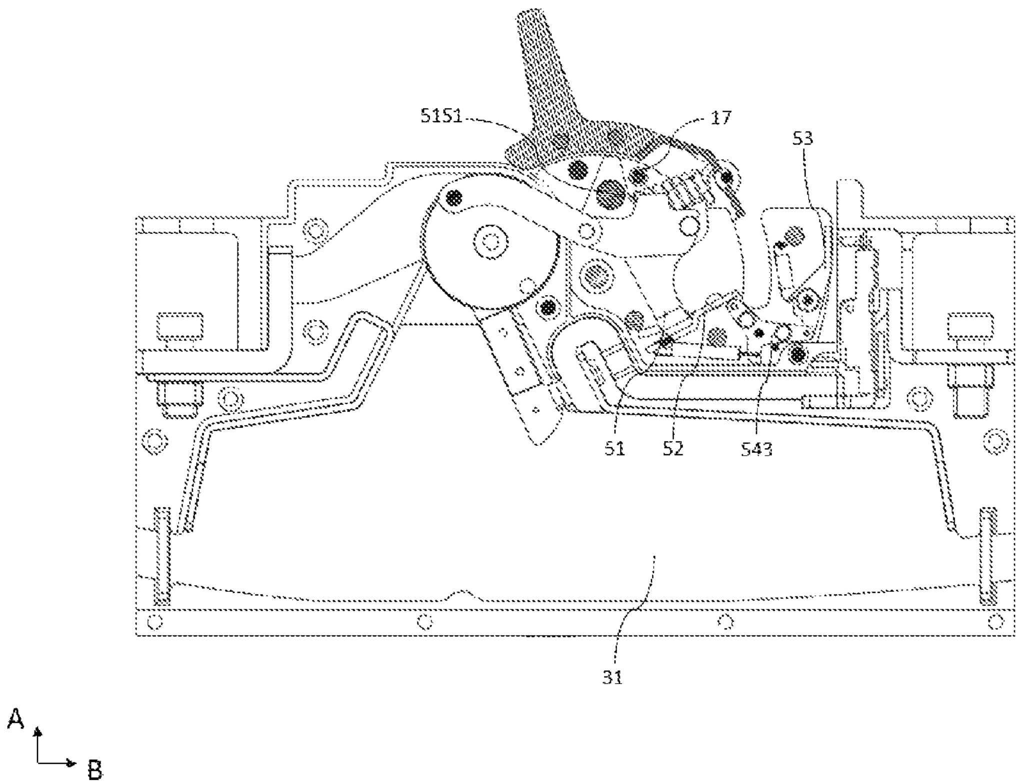
FIG. 3 is a schematic structural diagram of a circuit breaker in a closed state according to an embodiment of this application.

In the circuit breaker provided in the embodiments of this application, as shown in FIG. 3, the first connecting rod 41 is connected to a locking mechanism 5 through the first connecting point 411, the locking mechanism 5 sends a second signal to the transmission mechanism 4, and the transmission mechanism 4 drives the rotating wheel 13 to rotate, so as to drive the movable contact 14 to move. The locking mechanism 5 includes a first locking member 51 and a second locking member 52 locking each other, the first connecting rod 41 is connected to the first locking member 51 through the first connecting point 411, the first locking member 51 is rotatably connected to the support member 21 through a second rotating portion 5151, and the first specific point 413 coincides with the second rotating portion 5151. When the circuit breaker is in a closed state, the locking mechanism 5 is in a locked state, and the first connecting point 411 remains fixed. When the circuit malfunctions, the locking mechanism 5 is released from the locked state under an external force, the first locking member rotates counterclockwise, the first connecting point 411 moves with the locking mechanism 5, the first connecting point 411 rotates around the second rotating portion 5151, and then the rotating shaft 44 moves. In this case, a lower part of a mounting lug 515 pushes the rotating shaft 44 to produce a downward displacement in the second direction B, and the fourth connecting point 422 on the second connecting rod 42 begins to rotate around the first rotating portion 131 of the rotating wheel 13.

In some other embodiments, the locking mechanism 5 and the operation assembly 2 are synchronously stored in the accommodation portion 11, the locking mechanism 5 sends a second signal, and the transmission mechanism 4 transmits the second signal to the rotating wheel 13 in the second direction B, so as to drive the movable contact 14 to move.

When the circuit breaker is closed, the locking mechanism 5 is in the locked state, the movable and fixed contacts are in close contact with each other, and a relatively stable structure is presented inside the entire circuit breaker. When the overall circuit malfunctions, the internal stability of the circuit breaker is disrupted, the locking mechanism 5 changes from the locked state to an unlocked state, the locking mechanism 5 sends a second signal to the transmission mechanism 4, and the transmission mechanism drives the rotating wheel 13 to rotate, so as to drive the movable contact 14 to get away from the fixed contact 150. The movable and fixed contacts separate, and the circuit breaker changes from the closed state to an open state.

In some other embodiments, as shown in FIG. 3, the locking mechanism 5 includes a first locking member 51 and a second locking member 52 capable of locking each other, and the second signal is transmitted to the transmission mechanism 4 via the first locking member 51 and the second locking member 52, where an abutting point between the first locking member 51 and the second locking member 52 is located between the arc extinguishing chamber 31 and the transmission mechanism 4.

The locking mechanism 5 at least includes the first locking member 51 and the second locking member 52, and the two locking members lock each other to form a stable structure and complete transmission of force and locking of relative positions through the abutting point. In the process of changing from a locked state to an unlocked state or from an unlocked state to a locked state, the abutting point between the two locking members constantly changes, but remains between the arc extinguishing chamber 31 and the transmission mechanism 4, that is, the transmission process of the locking mechanism 5 occurs between the transmission mechanism 4 and the arc extinguishing mechanism 3. In the structure shown in FIG. 1, a locking chain formed by the locking mechanism 5 is located below a transmission chain formed by the transmission mechanism 4 and above the arc extinguishing mechanism 3. In the first direction A, the transmission mechanism 4, the locking mechanism 5, and the arc extinguishing device 3 jointly form a longitudinal arrangement structure from top to bottom, and the three are staggered without mutual interference. In the second direction B, the extension direction of the transmission mechanism 4 and the extension direction of the locking mechanism 5 are both lateral, and the transmission directions of the both are parallel to the second direction B. In this embodiment, the transmission of the transmission mechanism 4 in the second direction B indicates that the overall transmission direction has corresponding sequential transmission signals in the second direction B, rather than limiting corresponding transmission signals, connecting points, and mounting points to a straight line; and the transmission of the locking mechanism 5 in the second direction B indicates that the overall locking direction has corresponding sequential locking signals in the second direction B, rather than limiting corresponding locking points to a straight line.

The internal components of the conventional circuit breakers are usually arranged laterally, the arc extinguishing device is located on one side of the circuit breaker, the transmission mechanism is next to the arc extinguishing device, the locking mechanism is located on a side, away from the arc extinguishing device, of the transmission mechanism, and the transmission directions of the locking mechanism and the transmission mechanism are vertical. Such structural design results in low overall space utilization of the circuit breaker, and some parts of the transmission mechanism and the locking mechanism overlap to interfere with each other and affect normal use of the circuit breakers. Therefore, compared with the arrangement of the conventional circuit breakers, the layered arrangement of the transmission chain and the locking chain in this application can make full use of the spatial structure inside the circuit breaker and make the overall structure more compact, and the parts of the transmission mechanism and the locking mechanism do not interfere with each other, thereby improving overall reliability.

In some other embodiments, the locking mechanism 5 includes a third locking member 543 and a fourth locking member 53, the second locking member 52 and the third locking member 543 are capable of locking each other, the third locking member 543 and the fourth locking member 53 are capable of locking each other, a release 16 is provided in the accommodation cavity 12 on a side, away from the rotating wheel 13, of the accommodation portion 11, and the release 16 sends the second signal to the fourth locking member 53.

In this embodiment, the locking mechanism 5 includes a total of four locking members, which jointly form three locking structures. Compared with one locking mechanism in the conventional circuit breakers, the locking effect provided by the embodiments of this application is more secure and stable. The mutual positions and transmission directions of the four locking members are in the second direction B, that is, the entire locking mechanism 5 is in lateral transmission, and a line connecting rotation centers of the second locking member 52 and the third locking member 543 is roughly parallel to the second direction B to reduce the height of the locking mechanism 5. When the circuit breaker is closed, the first locking member 51 and the second locking member 52 lock each other, the second locking member 52 and the third locking member 543 lock each other, and the third locking member 543 and the fourth locking member 53 lock each other, where one end of the fourth locking member 543 is connected to the release 16. The release 16 includes an overcurrent release 161 and a release actuator 162. Under normal circumstances, there is a gap between the fourth locking member 53 and the release actuator 162. The gap is adjusted according to overcurrent multiples of different rated current to obtain overcurrent releases under different rated current. When the circuit malfunctions, the overcurrent release 161 senses an abnormality in the circuit and controls the release actuator 162 to move, and the fourth locking member 53 moves with the release actuator 162 and unlocks the third locking member 543. Subsequently, the second locking member 52 and the first locking member 51 are also successively unlocked and send a second signal to the transmission mechanism 4, and the transmission mechanism 4 transmits the signal to the rotating wheel 13 to separate the movable contact 14 from the fixed contact 15.

Figure 6:
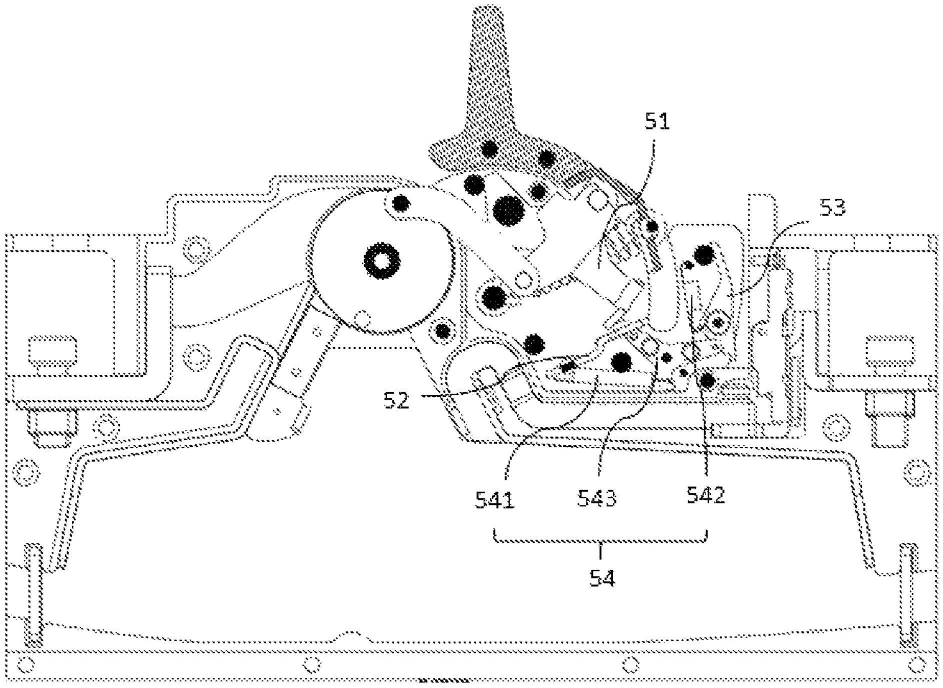
FIG. 6 is a schematic structural diagram of a locking mechanism of the circuit breaker according to an embodiment of this application.

Next, this application provides a detailed description of the locking mechanism 5. As shown in FIG. 6, the locking mechanism 5 includes a first locking member 51, a second locking member 52, a fourth locking member 53, and a linkage assembly 54.

Figure 7:
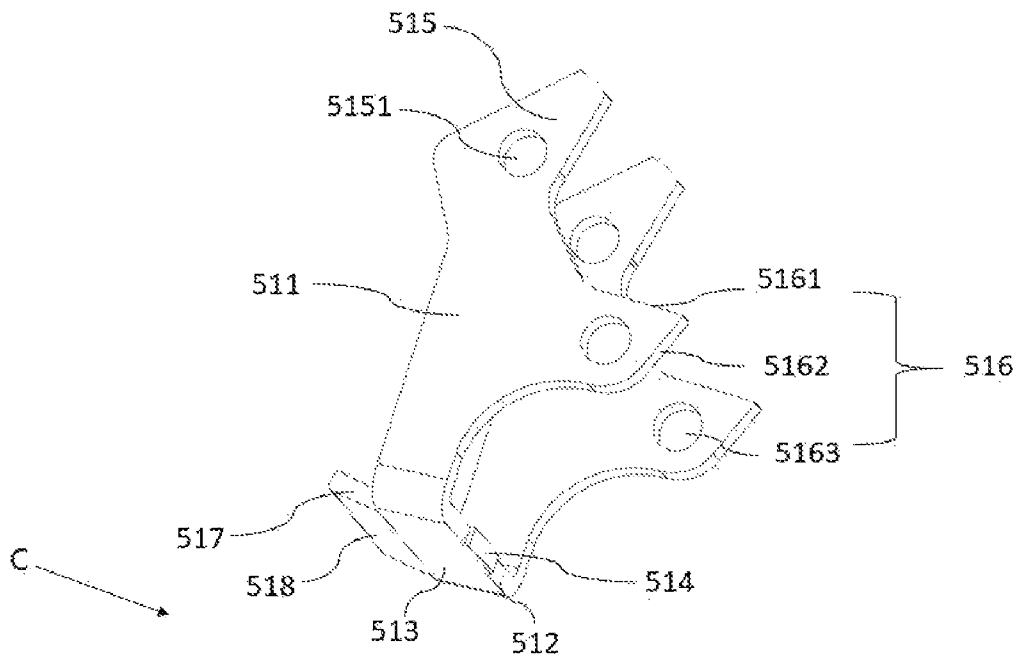
FIG. 7 is a schematic structural diagram of a first locking member according to an embodiment of this application.

As shown in FIG. 7, the first locking member 51 includes two first side plates 511 opposite to each other in a third direction C, and a connecting plate 512 connecting the two first side plates 511 at the same end; the connecting plate 512 has a first surface and a second surface 513 facing away from each other in its thickness direction, and a clamping surface 514 connected to the first surface and the second surface 513; and the first side plate 511 includes a mounting lug 515 which is located at an end, away from the connecting plate 512, of the first side plate 511.

Figure 8:
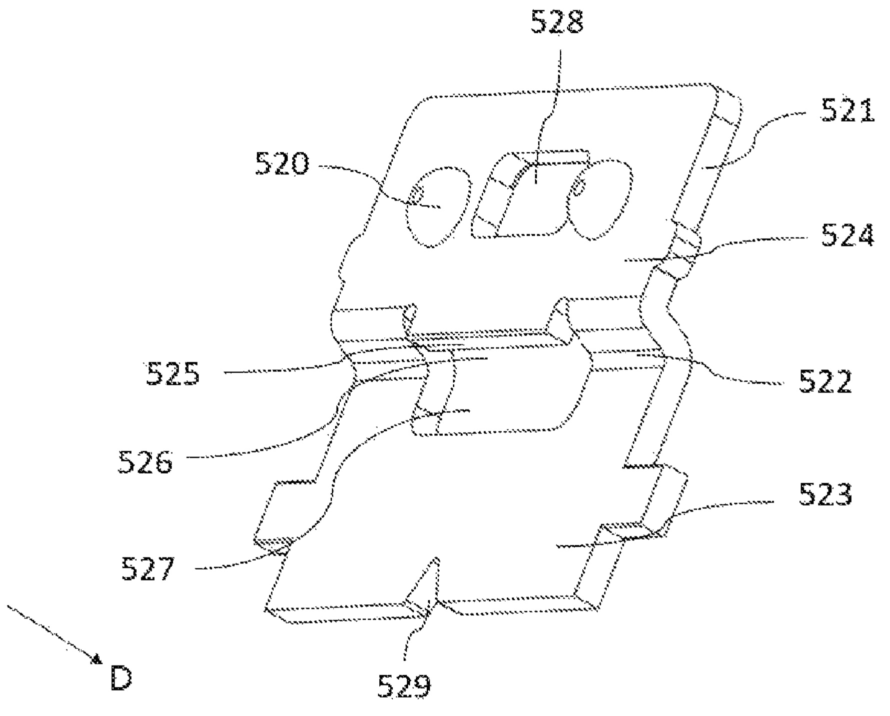
FIG. 8 is a schematic structural diagram of a second locking member according to an embodiment of this application.

As shown in FIG. 8, the second locking member 52 is located on a side, away from the mounting lug 515, of the connecting plate 512 and includes a clamping fit portion 521, and a first transmission portion 523 in misaligned connection with the clamping fit portion 521 in a fourth direction D via a transition connection portion 522; the clamping fit portion 521 includes a first side surface 524 and a second side surface facing away from each other in the fourth direction D, and a clamping fit surface 525 connected to the first side surface 524 and the second side surface; and the transition connection portion 522 is provided with a first avoidance hole 526 penetrating therethrough in the thickness direction, and the clamping fit surface 525 at least partially passes through the first avoidance hole 526.

Figure 9:
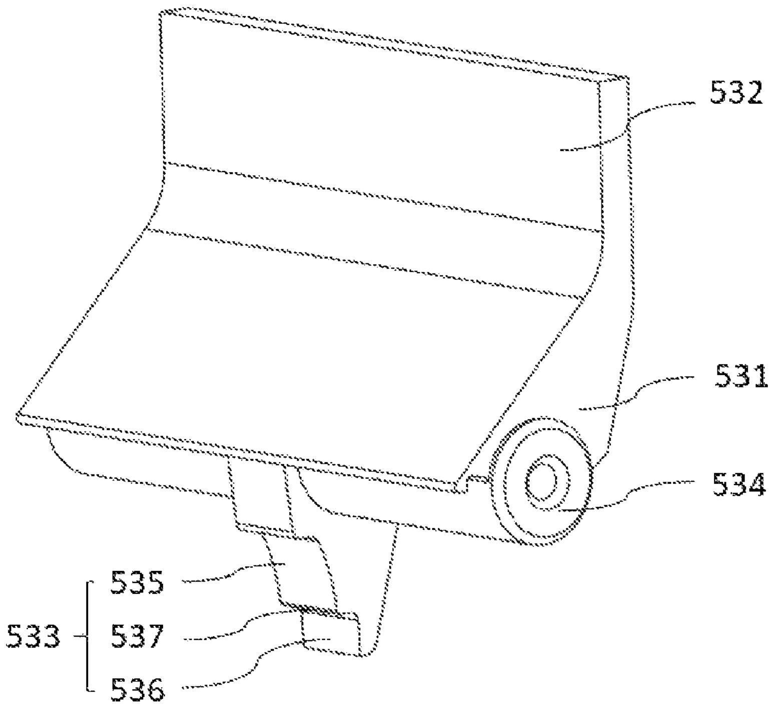
FIG. 9 is a schematic structural diagram of a fourth locking member according to an embodiment of this application.

As shown in FIG. 9, the fourth locking member 53 includes a substrate 531, and a second transmission portion 532 and a step structure 533 on two opposite sides of the substrate 531, where the substrate 531 is provided with a rotating shaft 534, the step structure 533 includes a first transition surface 535 and a second transition surface 536 connected to each other, and the second transition surface 536 is connected to a side, away from the substrate 531, of the first transition surface 535.

The linkage assembly 54 is configured for connecting the second locking member 52 and the fourth locking member 53. The locking mechanism 5 has a locked state and an unlocked state. When the locking mechanism 5 transitions from the unlocked state to the locked state, the first locking member 51 rotates clockwise from an initial position, the second locking member 52 rotates counterclockwise, then the clamping fit surface 525 abuts against the clamping surface 514, and the second locking member 52 enables the second transmission portion 532 to rotate clockwise to a first position through the linkage assembly 54. When the locking mechanism 5 transitions from the locked state to the unlocked state, the second transmission portion 532 rotates counterclockwise from the first position and enables the first locking member 51 to rotate clockwise through the linkage assembly 54, then the clamping fit surface 525 gets away from the clamping surface 514, and the first locking member 51 rotates counterclockwise to the initial position.

As shown in FIG. 7, the first locking member 51 is connected to the transmission mechanism 4, the two opposite first side plates 511 and the connecting plate 512 form a roughly U-shaped structure, the locking mechanism 5 transmits a second signal to the transmission mechanism 4 through the first locking member 51 to drive the separation of the movable and fixed contacts, the second rotating portion 5151 is arranged on the mounting lug 515 of the first locking member 5, and the first locking member 51 is rotatably connected to the support member 21 through the second rotating portion 5151.

As shown in FIG. 8, the second locking member 52 is configured for forming a locking structure together with the first locking member 51 and rotatably connected to the support member 21 through the first transmission portion 523. The first transmission portion 523 is provided with a transmission shaft at one end in the fourth direction D, and the first transmission portion 523 is rotatably mounted on the housing 1 through the transmission shaft. Only one or two transmission shafts may be provided, that is, the second locking member 52 may be rotatably connected to one side of the housing 1, or may be rotatably connected to two sides of the housing 1, and this application does not limit this.

As shown in FIG. 9, the fourth locking member 53 is configured for transmitting the second signal sent by the release 16, rotatably connected to the support 21 through the rotating shaft 534, and connected to the second locking member 52 through the linkage assembly 54; the second transmission portion 532 is adjacent to the release 16 to receive the signal sent by the release 16; and the step structure 533 is located on a side, away from the second transmission portion 532, of the fourth locking member 53 to form a locking mechanism together with the linkage assembly 54.

Generally, the locking mechanism 5 is used with the operation assembly 2 and the release 16. The operation assembly 2 can send a third signal to the locking mechanism 5 and drive the first locking member 51 to rotate, and the locking mechanism 5 changes from the unlocked state to the locked state. When the circuit malfunctions, the release 16 sends a second signal, the fourth locking member 53 transmits power to the locking mechanism 5, and the locking mechanism 5 changes from the locked state to the unlocked state.

Under the action of the third signal, the locking mechanism 5 changes from the unlocked state to the locked state. A specific workflow is as follows: the operation assembly 2 drives the first locking member 51 to rotate clockwise around the second rotating portion 5151 on the mounting lug 515, the first locking member 51 rotates and presses down the second locking member 52, the second locking member 52 rotates counterclockwise by the pressure of the first locking member 51 and the pulling of a first retractable member 541 in the linkage assembly 54, so that the clamping fit surface 525 abuts against the clamping surface 514, and the first locking member 51 and the second locking member 52 achieve first locking. The third locking member 543 in the linkage assembly 54 rotates clockwise and form second locking with the second locking member 52. The second transmission portion 532 rotates clockwise to the first position under the action of the linkage assembly 54 and forms third locking with the third locking member 543. In this case, the first locking member 51, the second locking member 52, the fourth locking member 53, and the linkage assembly 54 form a triple locking structure with each other, and the entire locking mechanism 5 is in a locked state. In the complete locked state inside the locked state, even if the operation assembly 2 continues to send a third signal to the locking mechanism 5, the locking mechanism 5 cannot be driven to move, that is, the operation assembly 2 can control the locking mechanism 5 to change only from the unlocked state to the locked state, but cannot control the locking mechanism 5 to change from the locked state to the unlocked state.

As shown in FIG. 1 and FIG. 3, when the circuit malfunctions, the release actuator 162 on the release 16 moves in a direction close to the fourth locking member 53 to drive the fourth locking member 53 to deflect, the locked state of the locking mechanism 5 is disrupted, the fourth locking member 53 rotates counterclockwise around the rotating shaft 534, the third locking member 543 in the linkage assembly 54 separates from the second transition surface 536 and moves to the first transition surface 535, and the locked state between the third locking member 543 and the fourth locking member 53 is released; and due to the counterclockwise rotation of the third locking member 543, the locked state between the third locking member 543 and the second locking member 52 is also correspondingly released, the second locking member 52 rotates clockwise around the transmission shaft on the first transmission portion 523, the first locking member 51 rotates counterclockwise under the action of external force, the clamping fit surface 525 does not abut against the clamping surface 514 any more, the locked state between the second locking member 52 and the first locking member 51 is released, the entire locking mechanism 5 transitions to an unlocked state, and the circuit breaker transitions from the state shown in FIG. 3 to the state shown in FIG. 1.

In the locking mechanism 5 of this application, as shown in FIG. 6, the linkage assembly 54 includes a first retractable member 541, a second retractable member 542, and a third locking member 543; the third locking member 543 is located on a side, away from the first side surface 524, of the second side surface, is Y-shaped and includes a first clamping end 5441, a second clamping end 5442, and a connecting end 5443 spaced apart; the first clamping end 5441 abuts against the second side surface, and the second clamping end 5442 abuts against the step structure 533;

one end of the first retractable member 541 is connected to the first transmission portion 523 of the second locking member 52, and the other end is connected to the connecting end 5443 of the third locking member 543; the third locking member 543 rotates clockwise under the action of the first retractable member 541, and the first clamping end 5441 rotates from a second position to a third position;

one end of the second retractable member 542 is connected to the substrate 531 of the fourth locking member 53; and when the first clamping end 5441 rotates from the second position to the third position, the fourth locking member 53 rotates clockwise under the action of the second retractable member 542, so that the second clamping end 5442 moves from the first transition surface 535 and clamps onto the second transition surface 536.

The third locking member 543 is connected to the second locking member 52 and the fourth locking member 53, forms a locking structure together with the second locking member 52 through the first clamping end 5441, and forms another locking structure together with the fourth locking member 53 through the second clamping end 5442. The first retractable member 541 is configured for driving the rotation of the third locking member 543, and the second retractable member 542 is configured for driving the rotation of the fourth locking member 53.

Figure 10:
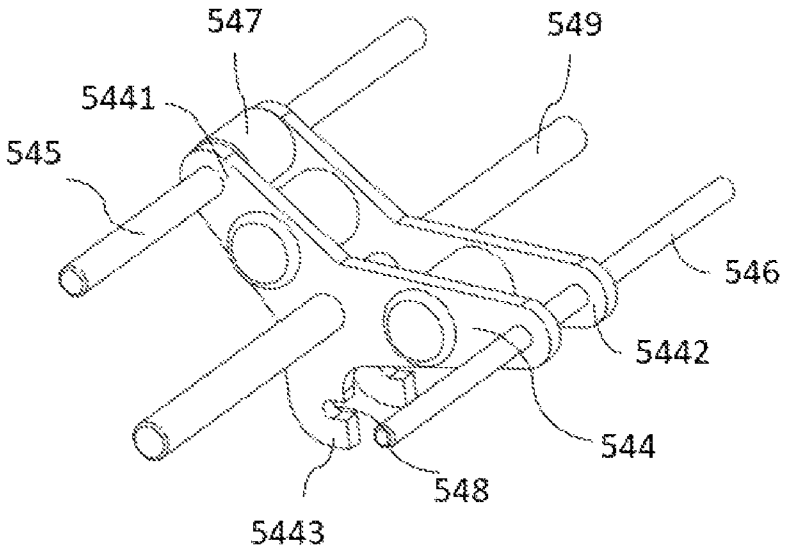
FIG. 10 is a schematic structural diagram of a third locking member according to an embodiment of this application.

As shown in FIG. 10, the third locking member 543 has a Y-shaped structure; the first clamping end 5441, the second clamping end 5442, and the connecting end 5443 are located at three end positions of the third locking member 543, respectively; the first clamping end 5441 abuts against the second side surface; when the locking mechanism 5 is in the locked state, the first clamping end 5441 is in the third position and farthest from the clamping fit surface 525; and when the locking mechanism 5 is in the unlocked state, the first clamping end 5441 is in the second position and closest to the clamping fit surface 525. The second clamping end 5442 abuts against the fourth locking member 53; when the locking mechanism 5 is in the locked state, the second clamping end 5442 abuts against the second transition surface 536; and when the locking mechanism 5 is in the unlocked state, the second clamping end 5442 abuts against the first transition surface 535.

One end of the first retractable member 541 is connected to the first transmission portion 523 of the second locking member 52, and the other end is connected to the connecting end 5443 of the third locking member 543. The first retractable member 541 is configured for driving the second locking member 52 and the third locking member 543. When the release 16 drives the fourth locking member 53 to rotate counterclockwise, the fourth locking member 53 and the third locking member 543 do not remain locked any more, the third locking member 543 rotates counterclockwise, the second clamping end 5442 moves from the second transition surface 536 to the first transition surface 535, the abutting point between the first clamping end 5441 and the second side surface moves downward with the first clamping end 5441, the elongation of the first retractable member 541 increases, and the second locking member 52 rotates counterclockwise under the drive of the elastic force of the first retractable member 541, thereby releasing the locked state of the first locking member 51 and the second locking member 52.

One end of the second retractable member 542 is connected to the substrate 531 of the fourth locking member 53, and the other end is connected to the housing 1, where the specific positions are determined by the internal structure of the circuit breaker. The second retractable member 542 is always in a tensile state to provide tensile force to the fourth locking member 53, thereby ensuring that the fourth locking member 53 will not shake or separate from the third locking member 543 when the locking mechanism 5 is in the locked state.

In the locking mechanism 5 of this application, as shown in FIG. 7, the first side plate 511 includes a transmission arm 516; the transmission arm 516 is located between the mounting lug 515 and the end, connected to the first side plate 511, of the connecting plate 512; and the transmission arm 516 and the clamping surface 514 are jointly located on the same side of the mounting lug 515, the transmission arm 516 includes a first abutting surface 5161 and a second abutting surface 5162 connected at an angle, and the first abutting surface 5161 and the second abutting surface 5162 form a clamping position for clamping.

The first connecting point 411 of the first connecting rod 41 is rotatably connected to the transmission arm 516, the first locking member 51 drives the first connecting rod 41 to move through the transmission arm 516, and the clamping surface 514 is configured for abutting against the clamping fit surface 525 of the second locking mechanism 5 to form a locking structure. In the second direction B, both the transmission arm 516 and the clamping surface 514 are located on one side of the mounting lug 515. In the structure shown in FIG. 1 of this application, both the transmission arm 516 and the clamping surface 514 are located on the right side of the mounting lug 515, and two limit shafts 17 are provided on the support member 21 in the second direction B and on two sides of the mounting lug 515. One of the limit shafts 17 is a connecting rod limit shaft, and is located on a side, away from the rotating wheel 13, of the mounting lug 515. When the unlocked state of the circuit breaker changes to the locked state, the connecting rod limit shaft is configured for increasing the movement rate of the first connecting rod 41, namely, an opening rate, while the limit shaft 17 on a side, relatively close to the rotating wheel 13, of the mounting lug 515 is configured for limiting the first locking member 51.

In the locking mechanism 5 of this application, as shown in FIG. 7 and FIG. 8, the first locking member 51 includes a guide plate 517, the guide plate 517 is connected to a guide surface opposite to the clamping surface 514 in the connecting plate 512 and extends from the guide surface away from the clamping surface 514, and the guide plate 517 has an arc-shaped guide surface 518 on a side away from the mounting lug 515. When the first locking member 51 rotates counterclockwise, the guide plate 517 abuts against the first side surface 524 through the arc-shaped guide surface 518. The first side surface 524 of the second locking member is provided with a protrusion 520. When the first locking member 51 rotates counterclockwise, the arc-shaped guide surface 518 abuts against the protrusion 520.

During the clockwise or counterclockwise rotation of the first locking member 51, the guide plate 517 is in contact with the second locking member 52 to play a guiding role. The design of the arc-shaped guide surface 518 can enable more stable and smooth sliding between the first locking member 51 and the second locking member 52. In addition, when the locking mechanism 5 is in the unlocked state, the guide plate 517 abuts against the protrusion 520, that is, the contact form between the first locking member 51 and the second locking member 52 is point contact, and the pressure at the contact point is relatively low.

In the locking mechanism 5 of this application, as shown in FIG. 8, the first side surface 524 is provided with a first through hole 528, and the first clamping end 5441 in the second position is clamped to the first through hole 528. The size of the first through hole 528 is determined by the size of the first clamping end 5441. When the locking mechanism 5 is in the unlocked state, the first clamping end 5441 is in the second position and clamped in the first through hole 528. When the locking mechanism 5 transitions from the unlocked state to the locked state, the first clamping end 5441 first separates from the through hole 528, moves relatively away from the clamping fit surface 525, and finally abuts against and locks the second locking member 52. The first retractable member 541 remains in an elongated state throughout this process.

In the locking mechanism 5 provided by the embodiments of this application, as shown in FIG. 8, the first transmission portion 523 has a second avoidance hole 527 penetrating therethrough in the fourth direction D and in commutation with the first avoidance hole 526. When the locking mechanism 5 transitions from the unlocked state to the locked state, the clamping surface 514 gradually approaches and finally fits closely with the clamping fit surface 525. In the movement process, the clamping surface 514 of the first locking member 51 enters the first avoidance hole 526 and the second avoidance hole 527 due to the effect of inertia, thereby avoiding direct rigid contact between the clamping surface 514 and the second locking member 52 and prolonging the service life of the first locking member 51.

In the locking mechanism 5 provided by the embodiments of this application, as shown in FIG. 10, the third locking member 543 includes two Y-shaped clamping plates 544 opposite to each other and each including a first free end 5441, a second free end 5442, and a third free end 5443; two first free ends 5441 are sheathed with a first shaft rod 545, two second free ends 5442 are sheathed with a second shaft rod 546, a portion of the first shaft rod 545 between the two Y-shaped clamping plates 544 is sleeved with a roller 547 which rolls between the second position and the third position, a portion of the second shaft rod 546 between the two Y-shaped clamping plates 544 moves between a first bent surface 535 and a second bent surface 536, and the first retractable member 541 is hung on the third free end 5443. In this solution, the third locking member 543 abuts against the second locking member 52 through the roller 547 which can rotate freely relative to the first shaft rod 545. Therefore, the point contact between the second locking member 52 and the third locking member 543 can be adjusted through the rotation of the roller 547 to avoid damage caused by rapid contact between the two.

In the locking mechanism 5 of this application, the third free end 5443 is provided with a mounting groove 548 for hanging the first retractable member 541. The first retractable member 541 may be connected to the second locking member 52 and the third locking member 543 in many ways. In this application, hooks are provided at two ends of the first retractable member 541, corresponding mounting grooves 548 are provided at the first transmission portion 523 of the second locking member 52 and the connecting end 5443 of the third locking member 543, and the two ends of the first retractable member 541 are hung on the second locking member 52 and the third locking member 543 separately.

In the locking mechanism 5 of this application, as shown in FIG. 9, the step structure 533 includes an arc-shaped transition surface 537 located on the first transition surface 535 and the second transition surface 536. In the locked state, the third locking member 543 abuts against the second transition surface 536. In the unlocked state, the third locking member 543 abuts against the first transition surface 535. During the transition of the locking mechanism 5 between the locked state and the unlocked state, the third locking member 543 starts from the first transition surface 535 and passes through the arc-shaped transition surface 537 to the second transition surface 536, or starts from the second transition surface 536 and passes through the arc-shaped transition surface 537 to the first transition surface 535. The arc-shaped transition surface 537 plays a smooth transition role in this process, thereby ensuring relatively stable movement between the third locking member 543 and the fourth locking member 53.

In some other embodiments, as shown in FIG. 6, the locking mechanism 55 surrounds a concave space, and the rotating member 22 slides inside a recessed portion of the concave space and sends the first signal to the transmission mechanism 44. The third locking member 543 is located inside the concave space and below the recessed portion, the first locking member 51 and the second locking member 52 are located on one side of the third locking member 543, the fourth locking member 53 is located on the other side of the third locking member 543, and the rotating member 22 can slide relatively within the recessed portion and send the first signal to the transmission mechanism 4 to move the movable contact 14, or send a third signal to the locking mechanism 5 to transition the locking structure from the unlocked state to the locked state. In this embodiment, each locking member in the locking mechanism 5 may alternatively be arranged in other ways than this application. As long as the locking mechanism 5 surrounds the concave space for relative movement of the rotating member 22, this application does not limit the arrangement ways.

Figure 11:
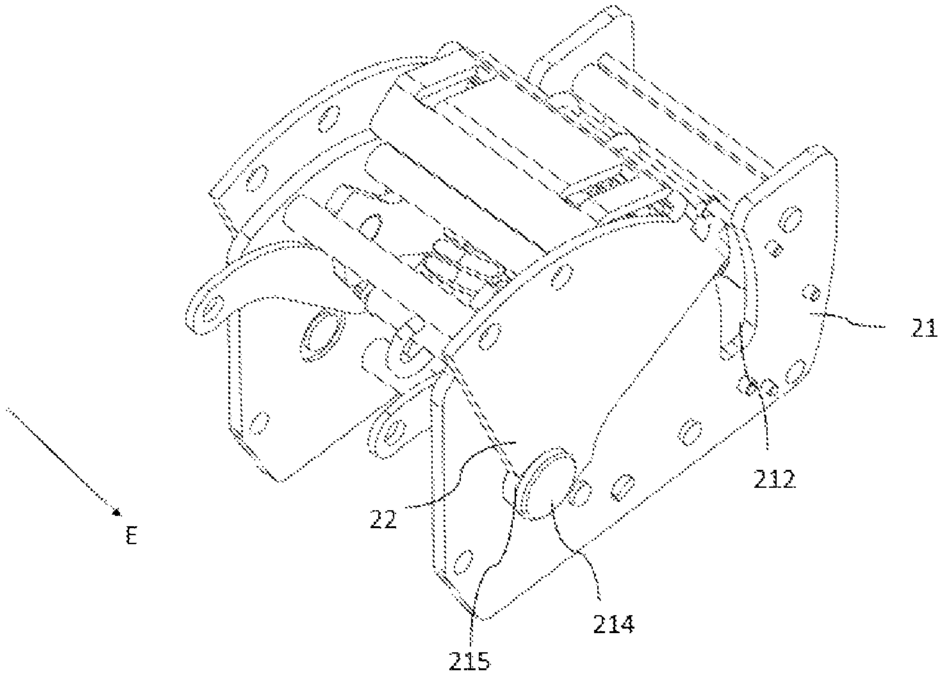
FIG. 11 is a schematic structural diagram of an operation assembly according to an embodiment of this application.

Next, this application provides a detailed description of the operation assembly 2. As shown in FIG. 11, the operation assembly 2 includes a support member 21, a rotating member 22, and a handle 23. The support member 21 includes two sub side plates 211 opposite to each other in a fifth direction E and each having a third avoidance hole 212 penetrating therethrough in the fifth direction E and recessed from one end of the sub side plate 211 to a central area of the sub side plate 211. The rotating member 22 is rotatably connected to the sub side plates 211 and can partially rotatably extend into the third avoidance holes 212. The rotating member 22 includes two rotating plates 221 opposite to each other in the fifth direction E, and a hanging portion 222 and a clamping portion between the two rotating plates 221. The two rotating plates 221 surround an accommodation space, and the two sub side plates 211 are clamped between the two rotating plates 221. Each rotating plate 221 has a rotating shaft connecting end 2211 for connecting the sub side plate 211 and a rotating end 2213 opposite to the rotating shaft connecting end 2211. The clamping portion and the hanging portion 222 are sequentially arranged at the rotating end 2213 in a direction where the rotating plate 221 is rotated into the third avoidance hole 212. The clamping portion has a first clamping surface and a second clamping surface 2232 that face the accommodation space and are connected at an angle, and the hanging portion 222 is configured for hanging the main elastic member 43 of the circuit breaker. The handle 23 is mounted on the rotating end 2213 and located on a side, away from the hanging portion 222, of the clamping portion.

Figure 12:
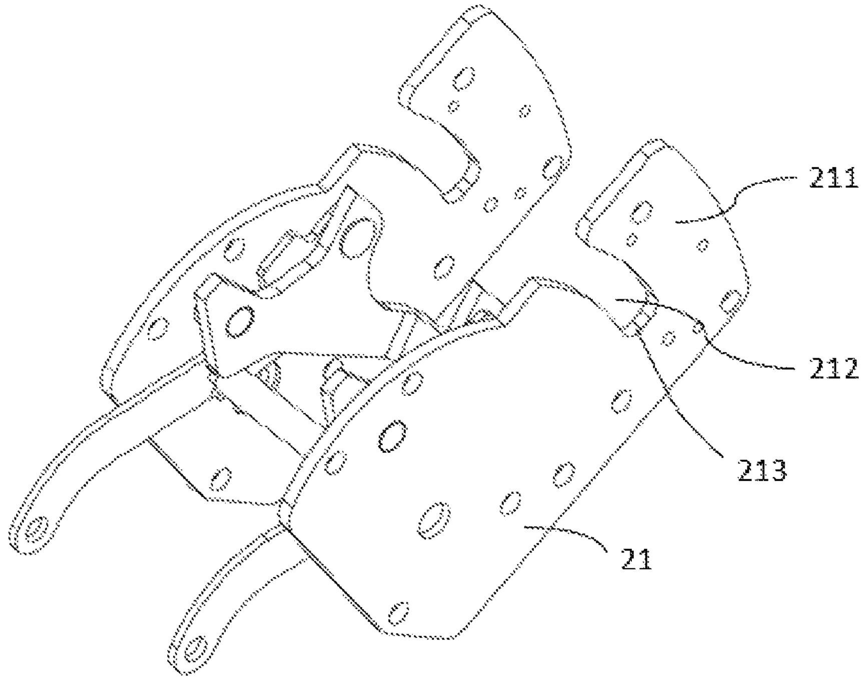
FIG. 12 is a schematic structural diagram of a support member according to an embodiment of this application.

As shown in FIG. 12, the operation assembly 2 for the circuit breaker in the embodiments of this application is provided with a third avoidance hole 212 on the sub side plate 211. The transmission mechanism 4 and the locking mechanism 5 are operated through the rotating member 22 that can be rotated into the third avoidance hole 212. Compared with existing setting of a closed ring, the space is fully used, then the space occupied by the operation assembly 2 is reduced, and the space occupied by the arc extinguishing device 3 is enlarged, so that the arc extinguishing device 3 can break high short-circuit current.

Figure 13:
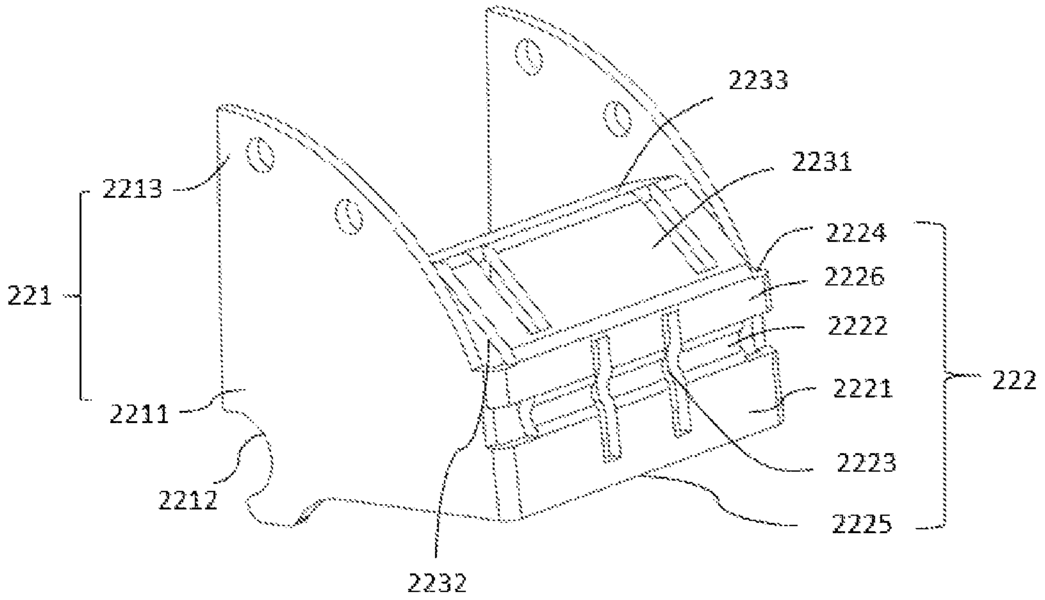
FIG. 13 is a schematic structural diagram of a rotating member according to an embodiment of this application.

In some optional embodiments, as shown in FIG. 13, the rotating end 2213 is provided with a through hole penetrating therethrough in the fifth direction E, and the handle 23 is fixedly connected to the rotating plate 221 via the through hole. Optionally, the two are in threaded connection, or certainly, may be connected by riveting, bonding, or the like.

In some optional embodiments, as shown in FIG. 11, the support member 21 includes a fixed pin 214 mounted on the sub side plate 211 and sheathed with a rolling wheel 215, and the rotating shaft connecting end 2211 has an arc-shaped clamping surface 2212 clamped to an outer circumference of the rolling wheel 215. The rolling wheel 215 is arranged on the fixed pin 214, so that the rotating plate 221 rotates more flexibly. Optionally, one fixed pin 214 is provided on each of the two sub side plates 211. Alternatively, one fixed pin 214 is provided on the two sub side plates 211 jointly.

In some optional embodiments, as shown in FIG. 13, the hanging portion 222 includes a body 2221 which has a shaft pin placement groove 2222 extending in the fifth direction E and having an opening facing away from the accommodating space, and a through hole 2223 through which the main elastic member 43 passes is provided in a bottom surface of the shaft pin placement groove 2222. The provision of the shaft pin placement groove 2222 and the through hole 2223 facilitates hanging of the main elastic member 43.

In some optional embodiments, as shown in FIG. 13, the clamping portion has a limit surface 2233 away from the first clamping surface, and the handle 23 abuts against the limit surface 2233. Through the limit surface 2233 facing away from the first clamping surface, the handle 23 provides support and limit during mounting to save time and labor in the mounting process.

In some optional embodiments, as shown in FIG. 13, the clamping portion has an avoidance surface 2231 facing away from the second clamping surface 2232 and connected to the limit surface 2233, the hanging portion 222 has a third surface 2226 facing away from the accommodation space, the avoidance surface 2231 is located between the limit surface 2233 and the third surface 2226, an angle between the avoidance surface 2231 and the limit surface 2233 is θ1, and an angle between the avoidance surface 2231 and the third surface 2226 is θ2, where $90° < \theta 1 < \theta 2$. The avoidance surface 2231 is provided, and the angles between the avoidance surface 2231 and the limit surface 2233 and between the avoidance surface 2231 and the third surface 2226 satisfy the foregoing relationship, so that the angle between the clamping portion and the hanging portion 222 can satisfy the condition for rotation of the rotating member 22 into the third avoidance hole 212.

In some optional embodiments, the rotating plate 221 is fan-shaped, and the rotating end 2213 includes an arc-shaped edge. Correspondingly, the third avoidance hole 212 is in an adapted arc shape. The fan-shaped rotating plate 221 is easy to manufacture and attractive, and can be rotated into the third avoidance hole 212 more smoothly.

In some optional embodiments, as shown in FIG. 11, the hanging portion 222 is arranged at an end of the arc-shaped edge rotated into the third avoidance hole 212, the hanging portion 222 has a first end 2224 and a second end 2225 opposite to each other in the rotating direction, and the sub side plate 211 has a side wall 213 surrounding the third avoidance hole 212. When the rotating member 22 is rotated into the third avoidance hole 212, the second end 2225 of the hanging portion 222 can abut against the side wall 213. Only one end of the arc-shaped edge of the rotating portion is rotated into the third avoidance hole 212, the hanging portion 222 is arranged at this end, and when the second end abuts against the side wall 213, the main elastic member 43 can obtain maximum tension, so as to provide enough elastic force for the subsequent process.

In some optional embodiments, the first end 2224 of the hanging portion 222 is connected to the clamping portion, and the clamping portion is fixedly connected to the sub side plate 211 through the hanging portion 222. The clamping portion is connected to the sub side plate 211 through the hanging portion 222. Such connections facilitate manufacturing with low cost. Optionally, the clamping portion and the hanging portion 222 are integrally formed, and the hanging portion 222 and the rotating plate 221 are integrally formed.

In other optional embodiments, the clamping portion is fixedly connected to the sub side plate 211, and the hanging portion 222 is fixedly connected to the sub side plate 211.

In some optional embodiments, the hanging portion 222 has a third end and a fourth end opposite to each other in the fifth direction E, a pin extending in the fifth direction E is provided at each of the third end and the fourth end, an insertion column extending in the fifth direction E is provided at the rotating end 2213 and provided with an insertion hole, and the pin is in interference fit with the insertion hole. The hanging portion 222 and the rotating plate 221 are configured in a matching insertion manner of the pin and the insertion hole, which facilitates disassembly of the hanging portion 222 and the clamping portion, so as to adapt according to different models of circuit breakers.

In some optional embodiments, the insertion column includes a plurality of first sub insertion columns and a plurality of second sub insertion columns, the plurality of first sub insertion columns are spaced apart in the extension direction of the arc-shaped edge, and the plurality of second sub insertion columns are spaced apart along the arc-shaped edge towards the rotating shaft connecting end 2211. The first sub insertion columns and the second sub insertion columns facilitate adjustment of specific positions of the hanging portion 222 and the clamping portion relative to the rotating plate 221, so as to adjust according to different models of circuit breakers or different needs. For example, when the circuit breaker cannot be used normally due to yielding and difficult rebounding of the main elastic member 43 after long-time use, the position of the hanging portion 222 can be slightly adjusted outward from the rotating shaft connecting end 2211 to the arc-shaped edge, and then the main elastic member 43 can be stretched to meet elastic force requirements.

Figure 14:
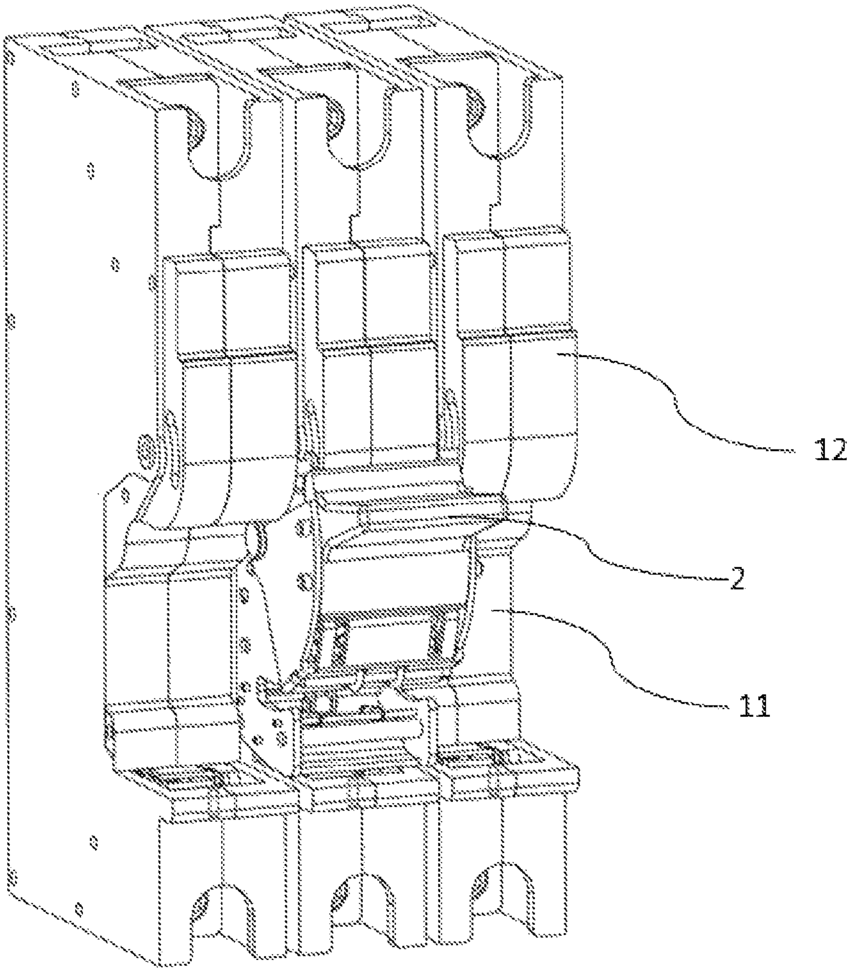
FIG. 14 is a schematic diagram of connection of a plurality of circuit breakers according to an embodiment of this application.

As shown in FIG. 14, when the operation assembly 2 is mounted to the housing 1, a connecting shaft rod first passes through the fourth connecting point 422 of the second connecting rod 42 and the peripheral portion 132 of the rotating wheel 13 to articulate the rotating wheel 13 and the second connecting rod 42. In this application, a plurality of housings 1 may be connected in series. When the plurality of housings 1 are connected in series, the operation assembly 2 may be mounted in any one of them, and the connecting shaft rod can extend into any housing 1 and drive different rotating wheels 13 to rotate. In this case, one connecting shaft rod can control a plurality of rotating wheels 13. Circuit breakers with other protective functions, such as overload protection or negative pressure protection, may be provided on the accommodation portions 11 of the other housings 1.

In some other embodiments, as shown in FIG. 1, a fixed contact 15 is provided in the accommodation cavity 12 and located on one side of the movable contact 14, and the rotating wheel 13 is configured for driving the movable contact 14 to move, so that the movable contact 14 gets close to or away from the fixed contact 15.

In some other embodiments, as shown in FIG. 2, the arc extinguishing device 3 further includes a fixed contact arc guide member 151 and a movable contact arc guide member 141; the fixed contact arc guide member 151 is located on a side, away from the movable contact 14, of the fixed contact 15; the movable contact arc guide member 141 is arranged on a side, away from the fixed contact arc guide member 151, of the movable contact 14; and the movable contact arc guide member 141, the fixed contact arc guide member 151, and the bottom surround the arc extinguishing chamber 31.

The movable contact arc guide member 141 and the fixed contact arc guide member 151 are located on two sides of the movable contact 14, and the fixed contact 15 is mounted on the fixed contact arc guide member 151. When the circuit breaker is in the open state, the movable contact 14 abuts against the movable contact arc guide member 141; and in the closed state, the movable contact 14 is separated from the movable contact arc guide member 141 and connected to the fixed contact 15 located on the fixed contact arc guide member 151. Deionization devices 18 are mounted on the movable contact arc guide member 141 and the fixed contact arc guide member 151 near the bottom of the housing 1. The movable contact arc guide member 141, the fixed contact arc guide member 151, and the deionization devices 18 surround the arc extinguishing chamber 31. Arc extinguishing grids, which are not shown in the figures, may be mounted inside the arc extinguishing chamber 31. An exhaust hole 19 is provided on a side, away from the arc extinguishing chamber 31, of the deionization device 18. The specific arrangement of the arc extinguishing grids, the movable and fixed arc extinguishing grids, the deionization devices, and the like may alternatively be different from the structures in the figures, and this application does not limit this.

As shown in FIG. 1, a wiring board 10 is further provided in the circuit breaker of this application at two ends of the housing 1 in the second direction B, the wiring board 10 is configured for connection with an external circuit, the wiring board 10 includes a first wiring board 101 and a second wiring board 102, the first wiring board 101 is electrically connected to the movable contact 14 in a form of soft connection or by means of other devices, the second wiring board 102 is electrically connected to both the fixed contact arc guide member 151 and the release 16, and the release 16 may sense, through the second wiring board 102, whether the external circuit operates normally. When the circuit malfunctions, the release 16 enables the locking mechanism 5 to move and separates the movable contact and the fixed contact 15, thereby ensuring circuit safety.

The usage states of the circuit breaker in this application may be divided into three stages, namely, a tripped state (namely, a free tripped open state), a locked state (namely, an open state), and a closed state. In both the tripped state and the locked state, the movable contact and the fixed contact 15 are not in contact with each other, indicating that the entire circuit breaker is in the open state. During normal use of the circuit breaker, the tripped state is an initial state of the circuit breaker, followed by the locked state, and finally the closed state. In the tripped state, the movable contact and the fixed contact 15 are not in contact with each other and the locking mechanism 5 is also in an unlocked state; the staff controls the operation assembly 2 to send a third signal to the locking mechanism 5, the locking mechanism 5 changes to a locked state, and the entire circuit breaker changes from the tripped state to the locked state. In this process, the movable contact 14 always abuts against the movable contact arc guide member 141. Afterwards, the operation assembly 2 is controlled to send a first signal to the transmission mechanism 4, the movable contact 14 is enabled to move close to and contact the fixed contact 15, the locking mechanism 5 remains locked, the entire circuit breaker changes from the locked state to the closed state, and the entire circuit is connected. When the release 16 detects a circuit malfunction, the release 16 operates and drives the locking mechanism 5 to move, and the locking mechanism is released from the locked state and sends a second signal to the transmission mechanism 4, so the rotating wheel 13 is enabled to drive the movable contact 14 away from the fixed contact 15, the circuit breaker changes from the closed state to the tripped state, and the entire circuit is disconnected.

The normal opening process of the circuit breaker in this application changes from the locked state to the closed state. When the circuit breaker is required to be manually disconnected, the operation assembly 2 is manually controlled to send a first signal to the transmission mechanism 4, so as to separate the movable contact and the fixed contact 15 and disconnect the entire circuit. However, in this process, the locking mechanism 5 is still in the locked state and has not changed, that is, the circuit breaker changes from the closed state to the locked state. When the circuit malfunctions, the release 16 detects the circuit malfunction and drives the locking mechanism 5 to move, the locking mechanism 5 controls the transmission mechanism 4 to drive the rotating wheel 13 to rotate, the movable contact and the fixed contact 15 separate, and the entire circuit is disconnected. In this process, the locking mechanism 5 is released from the locked state, that is, the circuit breaker changes from the closed state to the tripped state.

Figure 15:
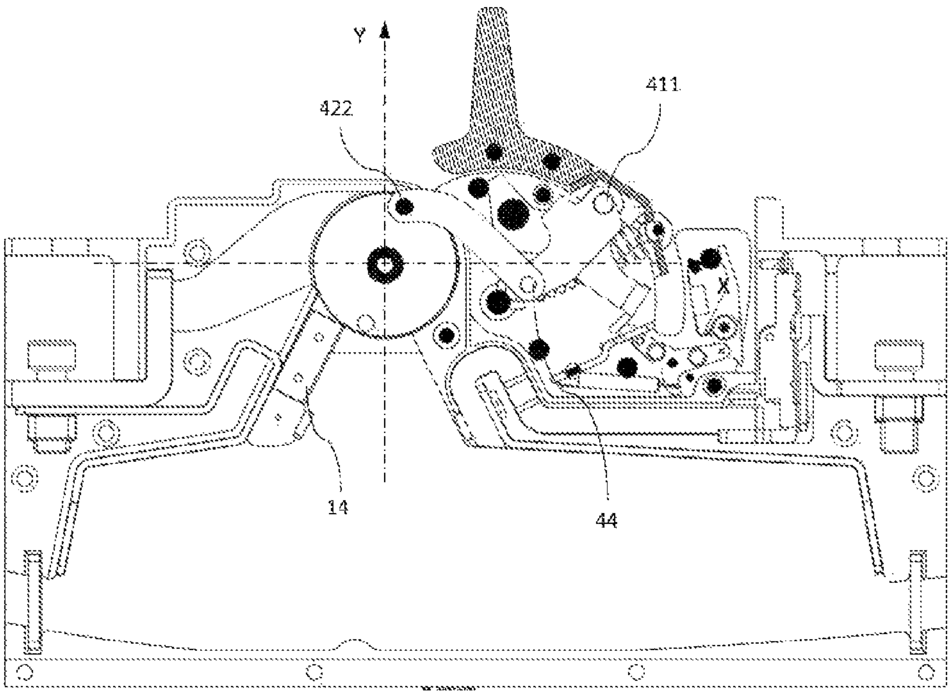
FIG. 15 is a structural cross-sectional view of a circuit breaker in a tripped state according to an embodiment of this application.
Figure 16:
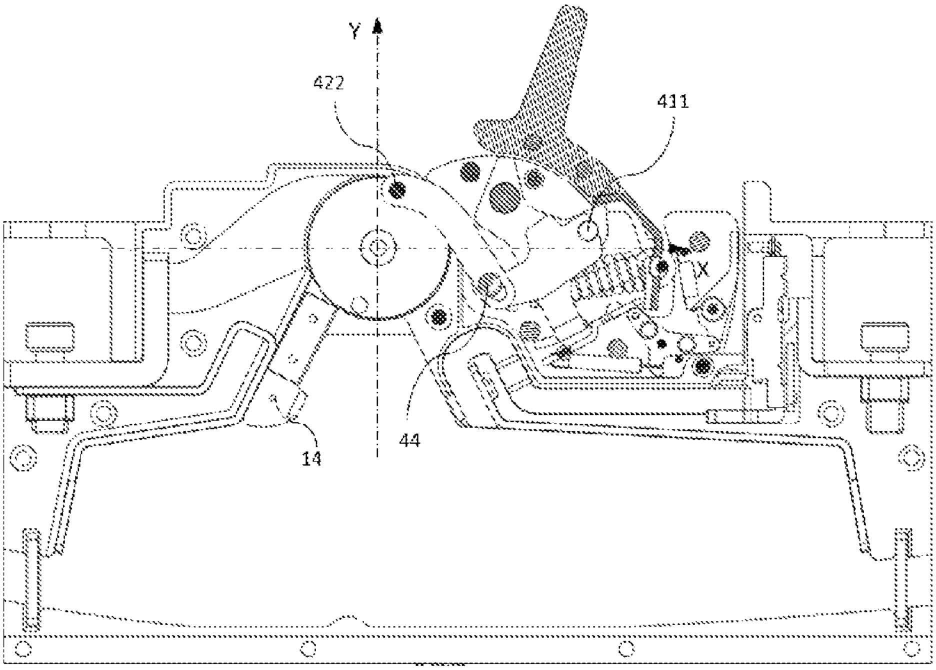
FIG. 16 is a structural cross-sectional view of a circuit breaker in a locked state according to an embodiment of this application.
Figure 17:
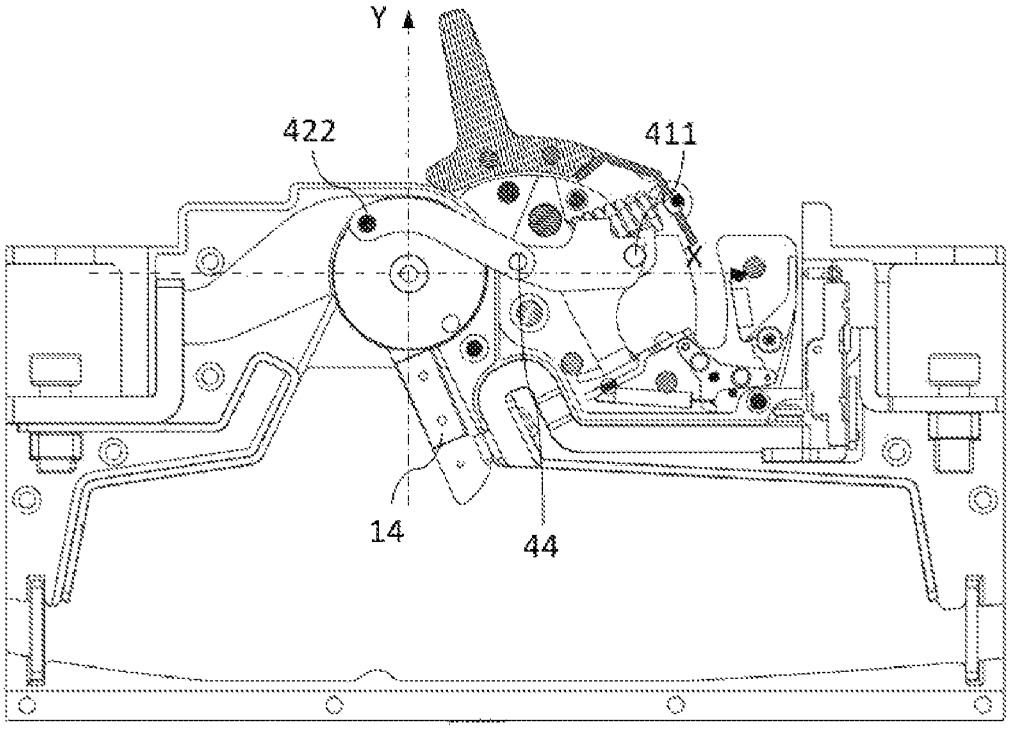
FIG. 17 is a structural cross-sectional view of a circuit breaker in a closed state according to an embodiment of this application.

FIGS. 15, 16, and 17 represent a tripped state, a locked state, and a closed state of the circuit breaker, respectively. In the figures, a rectangular coordinate system is established with the first rotating portion 131 of the rotating wheel 13 as a center, the lateral direction of the circuit breaker as an X axis, and the longitudinal direction of the circuit breaker as a Y axis, where a division into a total of four quadrant spaces is made by the X axis and the Y axis. In this application, the stripped, locked, and closed states of the circuit breaker will be described in detail with the structures shown in FIGS. 15-17, respectively.

FIG. 15 is a schematic structural diagram of the circuit breaker in the tripped state. The locking mechanism 5 is in an unlocked state, the arc-shaped guide surface 518 of the first locking member 51 abuts against the protrusion of the first side surface 524, and the first locking member 51 is in the initial position. The first clamping end 5441 of the transition member is located in the through hole 528, and the second clamping end 5442 abuts against the first bent surface 535. The first retractable member 541 is in a tensile state and has elastic potential energy. The second retractable member 542 is in a tensile state and has elastic potential energy.

The transmission arm 516 and the first connecting point 411 of the first locking member 51 are located in the first quadrant, the rotating shaft 44 connecting the first connecting rod 41 and the second connecting rod 42 is located in the fourth quadrant, and the second connecting rod 42 and the fourth connecting point 422 of the rotating wheel 13 are located in the first quadrant. In this case, the movable contact 14 abuts against the movable contact arc guide member 141 and the two are located in the third quadrant, while the fixed contact 15 is located in the fourth quadrant and separated from the movable contact 14.

FIG. 16 is a schematic structural diagram of the circuit breaker in the locked state. The locking mechanism 5 is in a locked state. When the circuit breaker changes from the tripped state to the locked state, the operation assembly 2 rotates clockwise to drive the first locking member 51 in the locking mechanism 5 to rotate clockwise. As the first locking member 51 does not abut against the protrusion of the second locking member 52, the first retractable member 541 releases energy, the second locking member 52 rotates counterclockwise under the elastic force of the first retractable member 541, and then the clamping fit surface 525 abuts against the clamping surface 514. In this case, the main elastic member 43 is in a tensile state, and the main elastic member 43 applies tensile force to the first locking member 51 through the first connecting rod 41, so that the first locking member 51 has a tendency to rotate counterclockwise. Meanwhile, the transition member rotates clockwise under the elastic force of the first retractable member 541, and its first clamping end 5441 moves from the second position to the third position. At this time, the second retractable member 542 releases energy to drive a traction member to rotate clockwise, and the second transmission portion 532 rotates to the first position, so that the second clamping end 5442 moves from the first transition surface 535 and is clamped to the second transition surface 536.

During the movement of the locking mechanism 5, the first connecting rod 41 moves with the first locking member 51, and the first connecting point 411 rotates clockwise but is still within the first quadrant. Compared with the tripped state, the distance between the first connecting point 411 and the X axis is shorter. In addition, the rotating shaft 44 moves downward under the drive of the first connecting rod 41, and the rotating shaft 44 is in a lowest position in the locked state. Throughout the entire movement process, the fourth connecting point 422 remains within the first quadrant and does not produce displacement, that is, the rotating wheel 13 does not rotate, the movable contact 14 still abuts against the movable contact arc guide member 141 and separates from the fixed contact 15, and the circuit breaker remains in an open-circuit state internally.

FIG. 17 is a schematic structural diagram of the circuit breaker in the closed state. The locking mechanism 5 is in the locked state. When the circuit breaker changes from the locked state to the closed state, the rotating member 22 of the operation assembly 2 rotates counterclockwise and the main elastic member 43 moves together. The elongation of the main elastic member 43 gradually increases. When the main elastic member 43 crosses the first connecting point, the direction of force applied to the first connecting rod 41 by the main elastic member 43 changes, and the main elastic member 43 begins to release elastic force and pulls the rotating shaft 44 to move upwards. Afterwards, the elongation of the main elastic member 43 gradually decreases, the rotating shaft 44 moves from the fourth quadrant to the first quadrant, the second connecting rod 42 moves with the rotating shaft 44, and the fourth connecting point 422 rotates counterclockwise from the first quadrant to the second quadrant, that is, the rotating wheel 13 begins to rotate counterclockwise and drives the movable contact 14 to move, and the movable contact 14 gradually approaches and finally contacts the fixed contact 15 located in the fourth quadrant. In this process, the locking mechanism 5 remains in the locked state, so the first connecting point 411 connected to the first locking member 51 remains in the first quadrant and remains fixed, and the first connecting rod 41 rotates clockwise around the first connecting point 411.

When the circuit breaker is required to be manually disconnected, the rotating member 22 of the operation assembly 2 is manually driven to rotate clockwise, and the elongation of the main elastic member 43 gradually increases. When the main elastic member 43 crosses the first connecting point 411, the main elastic member 43 begins to release elastic force and pulls the rotating shaft 44 to move downwards. Afterwards, the elongation of the main elastic member 43 gradually decreases, the rotating shaft 44 moves from the first quadrant to the fourth quadrant, the second connecting rod 42 moves with the rotating shaft 44, the fourth connecting point 422 rotates clockwise from the second quadrant to the first quadrant, that is, the rotating wheel 13 rotates clockwise and drives the movable contact 14 away from the fixed contact 15, and the movable contact 14 finally abuts against the movable contact arc guide member 141 located in the third quadrant. In this process, the locking mechanism 5 does not move, and the circuit breaker changes from the closed state to the locked state.

When the release 16 detects a malfunction in the circuit, a contact of the release 16 produces displacement to drive the fourth locking member 53 to rotate counterclockwise, and the second clamping end 5442 of the transition member does not abut against the second transition surface 536 any more. As the first locking member 51 applies pressure to the second locking member 52 through the clamping surface 514, the second locking member 52 rotates clockwise and squeezes the roller 547 through the back of the first side surface 524, and the third locking member 543 is enabled to rotate counterclockwise until entering into the first through hole 528. The second clamping end 5442 of the third locking member 543 does not abut against the second transition surface 536 any more, the second locking member 52 loses the support force of the first clamping end 5441 and then rotates clockwise under the pressure, the clamping fit surface 525 gets away from the clamping surface 514, and the first locking member 51 rotates counterclockwise to the initial position. In some optional embodiments, a limit rod is provided on a side, close to the second locking member 52, of the first retractable member 541, and two ends of the limit rod are fixedly connected to the sub side plates 211. By means of the limit rod, upward movement of the first retractable member 541 in the locked state is avoided.

The first locking member 51 rotates counterclockwise to drive the first connecting rod 41 to move together, the first connecting point 411 rotates counterclockwise away from the X axis, the rotating shaft 44 moves downward and moves from the first quadrant to the fourth quadrant, the second connecting rod 42 moves with the rotating shaft 44, the fourth connecting point 422 rotates clockwise from the second quadrant to the first quadrant, that is, the rotating wheel 13 rotates clockwise and drives the movable contact 14 away from the fixed contact 15, and the movable contact 14 finally abuts against the movable contact arc guide member 141 located in the third quadrant. Driven by the locking mechanism 5, the movable contact and the fixed contact 15 separate, and the circuit breaker changes from the closed state to the tripped state.

The embodiments of this application provide a circuit breaker including an operation assembly, an arc extinguishing device, a transmission mechanism, a locking mechanism, and the like, where the transmission mechanism is configured for transmitting power to the rotating wheel to drive the movable contact to move, and the operation assembly sends a first signal to the transmission mechanism to achieve manual control on opening and closing. During closing, the locking mechanism remains in a locked state to ensure the stability of the internal structure of the circuit breaker. When the circuit malfunctions, the locking mechanism is unlocked and sends a second signal to the transmission mechanism to separate the movable and fixed contacts. The transmission mechanism in this application is in lateral transmission and the transmission direction is parallel to the length direction of the arc extinguishing chamber. Therefore, under the premise of a definite volume of the entire circuit breaker, the size of the arc extinguishing chamber is larger, and interference between the transmission mechanism and other components can be avoided to improve overall reliability. In this embodiment, the transmission of the transmission mechanism 4 in the second direction B indicates that the overall transmission direction has corresponding sequential transmission signals in the second direction B, rather than limiting corresponding transmission signals, connecting points, and mounting points to a straight line.

Although the disclosed embodiments of this application are as described above, the described content is only for the purpose of easy understanding of this application and is not intended to limit the present application. Any person skilled in the art of this application may make any modifications and changes in forms and details of implementation without departing from the spirit and scope disclosed in this application, but the scope of protection of this application shall still be subject to the scope defined in the appended claims.

Described above are only the specific embodiments of this application, and those skilled in the art can clearly understand that, for the convenience and conciseness of the description, the replacement of other connections described above and the like can refer to the corresponding processes in the foregoing method embodiments, and will not be repeated here. It should be understood that the protection scope of this application is not limited thereto. A skilled person in the art can readily conceive various equivalent modifications or replacements within the technical scope disclosed by this application, and these modifications or replacements shall fall within the protection scope of this application.

What is claimed is:

1. A circuit breaker, comprising:

a housing having, in a first direction, a bottom and a top opposite to each other, an accommodation portion recessed from the top to the bottom, and an accommodation cavity semi-surrounding the accommodation portion, wherein a rotating wheel and a movable contact connected to the rotating wheel are provided in the accommodation cavity close to the top and adjacent to the accommodation portion in a second direction, and the first direction intersects the second direction;

an operation assembly rotatably and detachably connected to the top of the housing;

an arc extinguishing device comprising an arc extinguishing chamber located in the accommodation cavity and close to the bottom;

a transmission mechanism for transmitting, to the rotating wheel, a first signal sent by the operation assembly in the second direction, so as to drive the movable contact to move; and a locking mechanism, wherein the locking mechanism and the operation assembly are synchronously stored in the accommodation portion, and the locking mechanism sends a second signal which is transmitted by the transmission mechanism to the rotating wheel in the second direction, so as to drive the movable contact to move;

wherein the locking mechanism comprises a first locking member and a second locking member capable of locking each other, the second signal is transmitted to the transmission mechanism via the first locking member and the second locking member, and an abutting point between the first locking member and the second locking member is located between the arc extinguishing chamber and the transmission mechanism;

the locking mechanism further comprises a third locking member and a fourth locking member, the second locking member and the third locking member are capable of locking each other, the third locking member and the fourth locking member are capable of locking each other, a release is provided in the accommodation cavity on a side, away from the rotating wheel, of the accommodation portion, the release sends the second signal to the fourth locking member, and an abutting point between the second locking member and the third locking member is located between the arc extinguishing chamber and the transmission mechanism.

2. The circuit breaker according to claim 1, wherein the transmission mechanism comprises a first connecting rod, a second connecting rod, and a main elastic member, the first connecting rod and the second connecting rod are rotatably connected through a rotating shaft, the first signal is transmitted to the rotating wheel via the first connecting rod and the second connecting rod, one end of the main elastic member is connected to the rotating shaft, and force applied to the rotating shaft by the main elastic member enables the rotating shaft to move in the first direction.

3. The circuit breaker according to claim 2, wherein the rotating wheel comprises a first rotating portion and a peripheral portion surrounding the first rotating portion, and the first rotating portion is rotatably arranged on the housing; and the first connecting rod has a first connecting point and a second connecting point in a length direction of the first connecting rod, and the first connecting point is configured for rotating around a first specific point; and the second connecting rod has a third connecting point and a fourth connecting point in a length direction of the second connecting rod, the second connecting point is rotatably connected to the third connecting point through the rotating shaft, the second connecting rod is connected to the peripheral portion through the fourth connecting point, and the second specific point coincides with the first rotating portion.

4. The circuit breaker according to claim 2, wherein the operation assembly is rotatably connected to the housing, and one end of the main elastic member is connected to the operation assembly and moves synchronously with the operation assembly.

5. The circuit breaker according to claim 2, further comprising a connecting rod limit shaft for increasing a movement rate of the first connecting rod.

6. The circuit breaker according to claim 2, wherein the arc extinguishing device further comprises a fixed contact arc guide member and a movable contact arc guide member, the fixed contact arc guide member is located on a side, away from the movable contact, of the fixed contact, the movable contact arc guide member is arranged on a side, away from the fixed contact arc guide member, of the movable contact, and the movable contact arc guide member, the fixed contact arc guide member, and the bottom surround the arc extinguishing chamber.

7. The circuit breaker according to claim 2, wherein an end, away from the rotating shaft, of the main elastic member is connected to the operation assembly.

8. The circuit breaker according to claim 1, wherein the operation assembly is capable of being rotatably stored in the accommodation portion or withdrawn from the accommodation portion.

9. The circuit breaker according to claim 1, wherein a fixed contact is provided in the accommodation cavity, the fixed contact is located on one side of the movable contact, and the rotating wheel is configured for driving the movable contact to move, so that the movable contact gets close to or away from the fixed contact.

10. The circuit breaker according to claim 1, wherein the locking mechanism surrounds a concave space, and the operation assembly slides inside a recessed portion of the concave space and sends the first signal to the transmission mechanism.

11. The circuit breaker according to claim 1, wherein the operation assembly is located between the rotating wheel and the release, and the operation assembly sends a third signal to drive the first locking member and the second locking member to lock.

* * * * *